United States Patent [19]
Shinskey

[11] Patent Number: 5,420,785
[45] Date of Patent: May 30, 1995

[54] SELF-TUNING DEADTIME PROCESS CONTROLLER

[75] Inventor: Francis G. Shinskey, Foxboro, Mass.

[73] Assignee: The Foxboro Company, Foxboro, Mass.

[21] Appl. No.: 67,741

[22] Filed: May 26, 1993

[51] Int. Cl.$^6$ .................. G06F 15/46; G05B 13/02
[52] U.S. Cl. ............................. 364/157; 364/162; 364/177
[58] Field of Search ............ 364/148, 152, 157, 1158, 364/159, 160, 161, 162, 163, 176, 177, 183; 318/561, 609, 610, 632

[56] References Cited

U.S. PATENT DOCUMENTS

| | | | |
|---|---|---|---|
| Re. 33,267 | 7/1990 | Kraus | 364/158 |
| 3,515,860 | 6/1970 | Fitzgerald, Jr. | 364/155 |
| 3,617,717 | 11/1971 | Smith | 364/156 |
| 3,617,717 | 11/1971 | Smith | 364/156 |
| 3,671,725 | 6/1972 | Bakke | 364/159 |
| 3,671,725 | 6/1972 | Bakke | 364/159 |
| 3,786,242 | 1/1974 | Brooks | 364/159 |
| 3,786,242 | 1/1974 | Brooks | 364/159 |
| 3,798,426 | 3/1974 | Bristol, II | 364/161 X |
| 3,867,712 | 2/1975 | Harthill et al. | 340/6 R |
| 3,876,872 | 4/1975 | Spitz | 364/154 |
| 3,878,982 | 4/1975 | Hoffman | 364/154 |
| 3,881,651 | 5/1975 | Wilhelm, Jr. | 364/154 |
| 3,961,234 | 6/1976 | Chambers et al. | 318/561 |
| 3,992,616 | 11/1976 | Acker | 235/156 |
| 3,995,478 | 12/1976 | Wilhelm, Jr. | 364/153 |
| 4,186,384 | 1/1980 | Acker | 340/347 AD |
| 4,346,433 | 8/1982 | Rutledge | 364/162 |
| 4,346,433 | 8/1982 | Rutleage | 364/162 |
| 4,441,151 | 4/1984 | Hayashibe | 364/157 |

(List continued on next page.)

FOREIGN PATENT DOCUMENTS

| | | | |
|---|---|---|---|
| 0405924 | 6/1989 | European Pat. Off. | G06F 3/05 |
| 932461 | 5/1982 | U.S.S.R. | G05B 15/00 |
| 1012202 | 4/1983 | U.S.S.R. | G05B 13/02 |
| WO93/09481 | 5/1993 | WIPO . | |

OTHER PUBLICATIONS

European Search Report issued in prosecution of EP 94 30 3749 dated 19 Aug. 1994.

Teng Fong-Chwee, H. R. Sirisena, Self Tuning PID Controllers for Dead Time Processes, 8094 I.E.E.E. *Transactions on Industrial Electronics* 35 (1988) Feb. No. 1, pp. 119-125.

Kevin L. Anderson, Gilmer L. Blankenship, and Lawrence G. Lebow, A Rule-Based Adaptive PID Controller, Proceedings of the 27th IEEE Conference on Decision and Control, Dec. 1988, vol. 1, pp. 564-569.

F. G. Shinskey, How Good Are Our Controllers in Absolute Performance and Robustness?, 2190 *Measurement & Control* 23 (1990) May, No. 4, pp. 114-121.

D. L. Ulery, "Software Requirements for Statistical Quality Control" Instrument Society of America, International Conference and Exhibit (Oct. 1986).

Badavas et al. "Statistical Process Control Embedded in Open Industrial Systems" Instrument Society of America, International Conference and Exhibit (Oct. 1988).

Epperly et al. "Statistical Process Control Integrated with Distributed Control Systems" National Petroleum Refiners Association, Computer Conference (Oct. 1988).

(List continued on next page.)

*Primary Examiner*—Joseph Ruggiero
*Attorney, Agent, or Firm*—Lahive & Cockfield

[57] ABSTRACT

A self-tuning deadtime controller for adaptively adjusting one or several controller parameters during process control activities. The controller tunes, for example, the controller deadtime and the proportional band to optimize deadtime controller performance. The high performance of a deadtime controller is maintained even though the controller is incorrectly pretuned or if the process is subject to loads which change its characteristics.

20 Claims, 12 Drawing Sheets

U.S. PATENT DOCUMENTS

| | | | |
|---|---|---|---|
| 4,441,151 | 4/1984 | Hayashibe | 364/157 |
| 4,602,326 | 7/1986 | Kraus | 364/158 |
| 4,669,040 | 5/1987 | Pettit et al. | 364/157 X |
| 4,814,968 | 3/1989 | Fukumoto | 364/177 X |
| 4,855,897 | 8/1989 | Schinskey | 364/148 |
| 4,903,192 | 2/1990 | Saito et al. | 364/157 |
| 4,903,192 | 2/1990 | Saito et al. | 364/157 |
| 4,959,767 | 9/1990 | Buchner et al. | 364/157 |
| 4,959,767 | 9/1990 | Buchner et al. | 364/157 |
| 5,091,844 | 2/1992 | Waltz | 364/153 |
| 5,124,626 | 6/1992 | Thoen | 318/610 |
| 5,124,626 | 6/1992 | Thoen | 318/610 |
| 5,191,521 | 3/1993 | Brosilow | 364/160 |
| 5,191,521 | 3/1993 | Brosilow | 364/160 |

OTHER PUBLICATIONS

J. F. MacGregor, "On–Line Statistical Process Control" Chemical Engineering Progress, (Oct. 1968).

Badavas eet al. "Meeting the Challenges of the 90's with the Intelligent Automation Series" Foxboro Co. Presentation on he I/A Series as applied to Paper and Pulp Industry (May 1988).

F. G. Shinskey, "Model Predictors: The first smart Controllers", I&CS, Sep. 1991, pp. 49–52.

F. G. Shinskey, "Controlling Temperature In Batch Reactors", INTECH Engineer's Notebook, Apr. 1992, pp. 69–72.

F. G. Shinskey, "Evaluating Feedback Controllers Challenges Users and Vendors", Control Engineering, Sep. 1991, pp. 75–78.

F. G. Shinskey, "Absolute Performance and Robustness Measures for Controllers", Forth–Sixth Annual Symposium on Instrumentation for the Process Industries, Jan. 22 24, 1991, pp. 55–63.

F. G. Shinskey, "Putting Controllers to the Test", Chemical Engineering, Dec. 1990, pp. 96–106.

F. G. Shinskey, "Process Control Systems" McGraw-Hill Book Company, 1988, pp. 150–157.

SELF-TUNING DEADTIME PROCESS CONTROLLER

AUTHORIZATION

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

REFERENCE TO RELATED APPLICATIONS

This application is related to the following, commonly assigned applications, assigned to the assignee hereof and all filed on May 27, 1992.

U.S. patent application Ser. No. 07/889,472, for APPARATUS FOR ANALYZING PROCESS CHARACTERISTICS, now U.S. Pat. No. 5,341,288;

U.S. patent application Ser. No. 07/889,474, for APPARATUS FOR TUNING PROCESS CONTROL EQUIPMENT, now U.S. Pat. No. 5,319,539; and U.S. patent application Ser. No. 07/889,473, for IMPROVED METHOD AND APPARATUS FOR ADAPTIVE DEADTIME, now U.S. Pat. No. 5,335,165.

The teachings of the above-cited applications are incorporated herein by reference.

BACKGROUND OF THE INVENTION

The invention relates generally to process control and, more particularly, to an improved apparatus for tuning process control equipment according to the characteristics of the process itself.

"Process control" refers to the control of the operational parameters of a process by monitoring one or more of its characteristics over time. It is used to ensure that the quality and efficiency of a process do not vary substantially during a single run or over the course of several runs. Process control has application in both the manufacturing and service sectors. It has particular importance in the process control loop affecting product quality and the protection of personnel.

A process control unit, or "controller", typically operates by monitoring and comparing a process characteristic, the controlled variable, with a desired setpoint level to determine whether the process is operating within acceptable bounds. As the controlled variable begins to deviate from the setpoint, the controller manipulates one of the process input signals, the manipulated variable, to bring the process back to the desired level of activity.

Among the controllers developed by the art to minimize deviations in the controlled variable are the so-called proportional-integral-derivative (PID) controllers. These controllers generate the manipulated variable signal as a predetermined mathematical function of the controlled variable signal.

The output of a PID controller can be expressed by the mathematical relation:

$$m = \frac{100}{P}\left(e + \frac{1}{I}\int e\, dt - D\frac{dc}{dt}\right)$$

In this equation, m represents the controller-generated manipulated variable, which is input to the process itself to "manipulate" the process towards its desired setpoint range. The difference between the controlled variable c and the setpoint r is the error e. The variable P refers to the proportional band, usually expressed in percent, which establishes the range whereby a process deviation can occur without saturation. The time-rate derivative component, $dc/dt$, operates on the controlled variable with a time constant D. It is afterwards integrated by positively feeding back the controller output through a lag with a time constant I.

The serial action of the derivative component and feedback integration characterizes a PID controller. Quick process changes are, it is said, predicted by such controllers through the derivative time-rate component, $dc/dt$, inducing initial and large controller actions even though the actual deviation is small.

Another controller developed by the art is the proportional-integral (PI) controller. It is very similar to the PID controller but does not have the derivative component, i.e., the D parameter representing the derivative time constant. Without this derivative parameter D, the PI controller simply integrates process deviations over time and induces controller changes when the variation deviates in magnitude from the setpoint r.

Both the PID and PI controllers have acute limitations that depend upon the processes under control. For example, a PI controller is ineffective in controlling processes dominated by "lag". Lag is the time between an initial change in the controlled variable c due to change by the controller manipulated variable m and the time when the controlled variable c reaches 63.2 percent of its final value.

PID controllers fare better with lag-dominant processes because of the derivative-rate action, but its derivative-rate capability is useless if the process is predominantly "deadtime". Deadtime is the time it takes a change in the manipulated variable m applied to a process to be reflected by any change in the controlled variable c generated by that process.

For these reasons, the art developed deadtime controllers, which are constructed by adding a "deadtime" element, i.e., a time delay $\tau_d$ into the integral feedback loop of a typical PID or PI controller. This time delay, called the controller deadtime $\tau_d$, improves a deadtime controller's performance over both the PI and PID controllers by reducing the size, area, and response time of a deviation caused by a load change.

But this improved performance comes at a price. The process control loop can go unstable, even permanently, if the deadtime controller parameters, e.g., P, I, D, and especially $\tau_d$ are set, or "tuned", incorrectly. The success of a deadtime controller, therefore, hinges even more critically on how well it can be tuned.

Deadtime controllers can be pretuned, according to prior art teachings, by modifying the controller parameters before operating with a process. But, ensuring that the process remains stable thereafter is difficult, especially if the controller is slightly mis-tuned. Deadtime controllers are particularly susceptible to a phase mismatch between the controller and process deadtimes.

It is, accordingly, an object of the present invention to provide improved systems for tuning deadtime process controllers during process control activities.

More particularly, an object is to provide improved methods and apparatus for tuning process control equipment.

Still another object is to provide improved deadtime process control systems that better maintain tuning with the processes they control.

These and other objects are evident in the description within.

SUMMARY OF THE INVENTION

The invention attains the aforementioned objectives by providing methods and apparatus for self-tuning deadtime process controllers, and, more particularly for the closed-loop deadtime control of active processes.

Thus in one aspect, the invention provides improvements to deadtime controllers of the type which respond to a controlled variable signal, representing a process characteristic, and which generate a manipulated variable signal in accord with values of the controlled variable signal and one or more internal controller parameters, e.g., P, I, D, and $\tau_d$.

In one aspect, the improvement comprises a self-tuning section which modifies one or more of the internal controller parameters according to the characteristics of the manipulated variable signal and, thereby, optimizes deadtime controller performance.

Similarly, in another aspect, the improvement comprises a self-tuning section which modifies one or more of the internal controller parameters according to the characteristics of the deviation error signal—which is the difference between the controlled variable signal and a desired setpoint level—and, thereby, optimizes deadtime controller performance.

In yet another aspect, the improvement comprises a self-tuning section which adaptively changes the controller deadtime, $\tau_d$, according to the period of manipulated variable signal/output. The self-tuning section preferably measures the periodicity of the manipulated variable signal and biases the controller deadtime, $\tau_d$, to a region where the period-to-deadtime ratio is between 1.7 and 2.2. If the period-to-deadtime ratio is outside this region, the self-tuning deadtime controller iteratively adjusts the controller deadtime until it is inside the region. The self-tuning section monitors the controller manipulated variable signal automatically and thereby tunes the controller deadtime parameter, $\tau_d$, during process activities.

In still other aspects, the improvements comprise a self-tuning section which determines certain controller characteristics that are functionally dependent upon the process under control, such as the decay ratio $\delta$, controller overshoot $\Omega$, and recovery time $\theta$. The self-tuning deadtime controller then modifies one or more of the internal controller parameters e.g., $\tau_d$ and P, according to the above mentioned characteristics by comparing them against stored target values $\delta_{tgt}$, $\theta_{tgt}$ and $\Omega_{tgt}$. The self-tuning section then selects one or more rules based upon this comparison, if needed, to iteratively modify the internal controller parameters to improve process control performance. Additionally, particular rules are used for processes of different types, and if the controller has derivative action or not, and if the overshoot and recovery time are near target.

In yet another aspect, the self-tuning deadtime controller can be utilized to pre-tune one or more controller parameters prior to process control activities. For instance, the derivative time D, the deadtime $\tau_d$ and integral time I can be adjusted prior to operation according to references cited herein by a user of the self-tuning deadtime controller. In a preferred aspect, the controller parameters I and D, representing the integral time parameter and derivative time parameters, respectively, are "locked" after the controller is pretuned according to their relative ratio to $\tau_d$. During process control, those parameters are automatically adjusted to maintain that ratio while $\tau_d$ is modified according to specific tuning rules.

In another aspect, a method is provided for tuning deadtime controllers of the type which generate a manipulated variable signal and a deviation error signal, which is a function of a controlled variable signal and a preselected target value. The improvement comprises the steps of analyzing these signals and then modifying if required, one or more parameters of the controller during process control activities, to optimize controller performance.

In another aspect, the method includes the further step of measuring the periodicity of the manipulated variable signal and comparing the periodicity to the controller deadtime. If the ratio of the periodicity over deadtime is outside the range 1.7 to 2.2, the invention provides, in other aspects, rules to iteratively adjust the controller deadtime so that the ratio is maintained within this range during process control activities.

In still other aspects, the invention provides methods for analyzing certain process control characteristics, like the recovery time $\theta$ and overshoot $\Omega$ of the controlled variable signal, and the decay ratio $\delta$ of the manipulated variable signal. The self-tuning deadtime controller then adjusts one or more parameters of the controller according to these measured characteristics to improve the performance of the deadtime controller during process control activities.

The advantages of such a controller are many. It is flexible and can adapt to the many variables which insert loads to the process under control. The controller adapts one or many controller parameters based upon the real-time analysis of the controlled and manipulated variable signals to maintain the high performance capability of the deadtime controller. The self-tuning section, which is used in conjunction with a deadtime controller, further allows the storage of tuning rules that can be expanded or changed by standard programming techniques. Finally, the self-tuning deadtime controller can be efficiently used to adjust controller parameters prior to operational use. A user can, therefore, pretune any controller parameter to initial optimum settings, and freeze one or more of these parameters if desired.

These and other advantages and aspects of the invention are evident in the description which follows and in the accompanying drawings.

DETAILED DESCRIPTION OF THE ILLUSTRATED EMBODIMENTS

Figure 1:
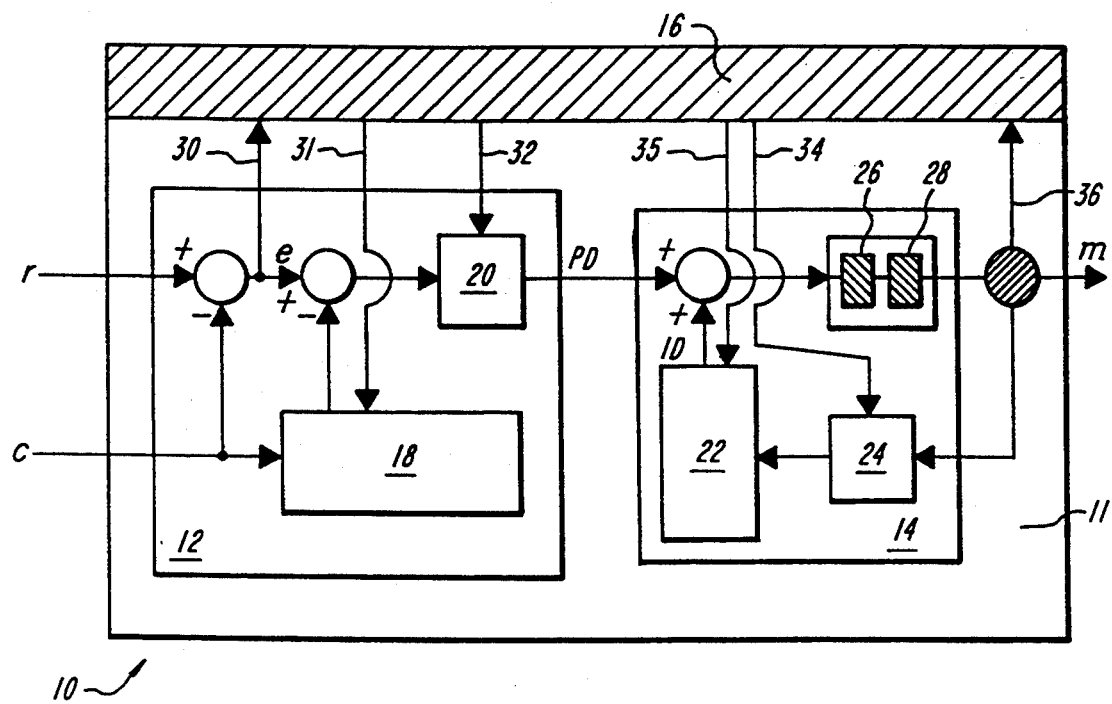
FIG. 1 depicts a preferred self-tuning deadtime controller constructed in accordance with the invention.

FIG. 1 illustrates a preferred self-tuning deadtime controller 10 constructed in accordance with the invention. The controller 10 includes a proportional-derivative section 12, an integral-deadtime feedback section 14, and a self-tuning section 16. The controller 10 accepts as input the controlled variable signal c and a desired setpoint signal r, and generates a manipulated variable signal m for input to the process under control. The controlled variable, signal c can be generated in a manner conventional to the art, for example, by measuring equipment coupled with the process itself. The setpoint level r can also be generated in a conventional manner, e.g., via an operator and console (not shown), or via the method and apparatus described in U.S. patent application Ser. No. 626,575, Method And Apparatus For Process Control With Optimum Setpoint Determination, now U.S. Pat. No. 5,239,456.

The proportional-derivative section 12 generates a PD signal for output to the integral-deadtime feedback section 14 representing an error in the controlled variable signal c particularly as a function of a time-rate of change of the controlled variable c and a difference between it and the setpoint r. The PD signal is then transformed by the integral-deadtime feedback section 14 to generate a signal, ID, representing a time-lagged and time-delayed form of the manipulated variable m. Time-lag is determined by the integral time-lag I; and time-delay is determined by the controller deadtime $\tau_d$. The manipulated variable m is output from the controller 10 and input to the process under control. A correct change in the manipulated variable signal m will bias the controlled variable c toward the desired setpoint r.

With particular regard to the proportional-derivative section 12, the derivative block 18 acts on the time-rate of change of the controlled variable c with a time constant D. The proportional band block 20 acts to determine an operational range—established by a percentage P—for unsaturated controller actions. Thus the proportional-derivative section 12 also controls the system gain, which is usually defined as the ratio of the change in controller 10 output in response to the error change or deviation of the controlled variable c.

The PD signal generated from the proportional-derivative section 12 and input to the integral-deadtime feedback section 14 is integrated with an integral time I at the integral block 22. It is time-delayed by a deadtime $\tau_d$ at the delay block 24. High frequency waveform components within the integral-deadtime feedback section 14 are preferably attenuated—according to a preferred embodiment—by a filter 26. The waveform is also preferably limited—by high and low amplitude limits—to reduce integral windup by a high/low amplitude limiter 28.

Illustrated deadtime control section 11 can be constructed in accord with conventional deadtime controller principles and, preferably in accord with the teachings of the above cited related patent applications, as modified to accommodate self-tuning section 16 in accord with the teachings below.

The self-tuning deadtime controller 10 monitors the manipulated variable signal m waveform and the deviation error signal e by sending these signals via signal lines 36 and 30, respectively, to the self-tuning section 16. That section 16 monitors each waveform and interprets specific waveform characteristics, and selectively applies one or more adapting rules to iteratively tune one or more controller parameters, e.g., P and $\tau_d$. Section 16 tunes the proportion band P of the proportional band block 20 via a P-control line 32. With reference to the integral-deadtime section 14, the self-tuning section 16 tunes the controller deadtime $\tau_d$ of the delay block 24 via a $\tau_d$-control line 34.

The self-tuning section 16 of the deadtime controller 10 operates to adjust controller parameters to thereby minimize the integrated absolute error (IAE) between the controlled variable signal c and the setpoint r for step load process changes introduced at the output of the controller 10. This technique makes the controller more responsive for most types of disturbances and at most points of entry into the closed loop.

The IAE cannot be minimized on an integrative basis, however, because that would require repeated disturbances of known size into the loop. The self-tuning deadtime controller 10 is designed to operate using the information from naturally occurring and, therefore, unknown disturbances. Consequently, measurements of certain features related to IAE for both the deviation error signal e and the manipulated variable signal m are used. These features and related calculations are discussed in detail below, and include the overshoot $\Omega$ and recovery time $\theta$ of the deviation error signal e, and the waveform period $\tau_o$ and decay ratio $\delta$ of the manipulated variable signal m.

To function properly, the controller 10 of FIG. 1 is first "pretuned" prior to actual use, for example, in accordance with U.S. patent application Ser. No. 07/889,472, for APPARATUS FOR ANALYZING PROCESS CHARACTERISTICS, now U.S. Pat. No.

5,341,288, through which operation the process gain, deadtime, and primary and secondary time constants $\tau_1$ and $\tau_2$ are estimated, and the initial settings P, I, D and $\tau_d$ are determined. Furthermore, "target" values of $\Omega$, $\theta$, and $\delta$ are established which represent load-response curves having minimum IAE deviations. These particularly desirable values are assigned as a function of process type in a procedure called "characterization". The self-tuning deadtime controller 10 then monitors and calculates the actual values of $\Omega$, $\theta$, and $\delta$ during process control activities and compares them to their target values $\Omega_{tgt}$, $\theta_{tgt}$, and $\delta_{tgt}$. It thereafter decides whether to adapt one or more controller parameters, e.g., $\tau_d$ and P, in accordance with an appropriate "tune rule" associated with the self-tuning section 16 to correct the error.

During the process of pretuning, the self-tuning section 16 can be used to set the initial control parameters. As FIG. 1 shows, the D-control line 31 and the I-control line 35, together with the $\tau_d$-control line 34 and the P-control line 32, allow a user to adjust any associated controller parameter via the self-tuning section 16 prior to operation. D and I are generally determined satisfactorily during pre-tuning, whereas $\tau_d$ may require self-tuning to be set accurately. Once $\tau_d$ is satisfactorily self-tuned, the self-tuning section 16 automatically adjusts D and I in their existing ratio relative to $\tau_d$. In other words, D and I are locked in their ratio to $\tau_d$ once $\tau_d$ is set correctly, and then adjusted whenever $\tau_d$ is adjusted in accordance with the several tuning rules described below.

Figure 1A:
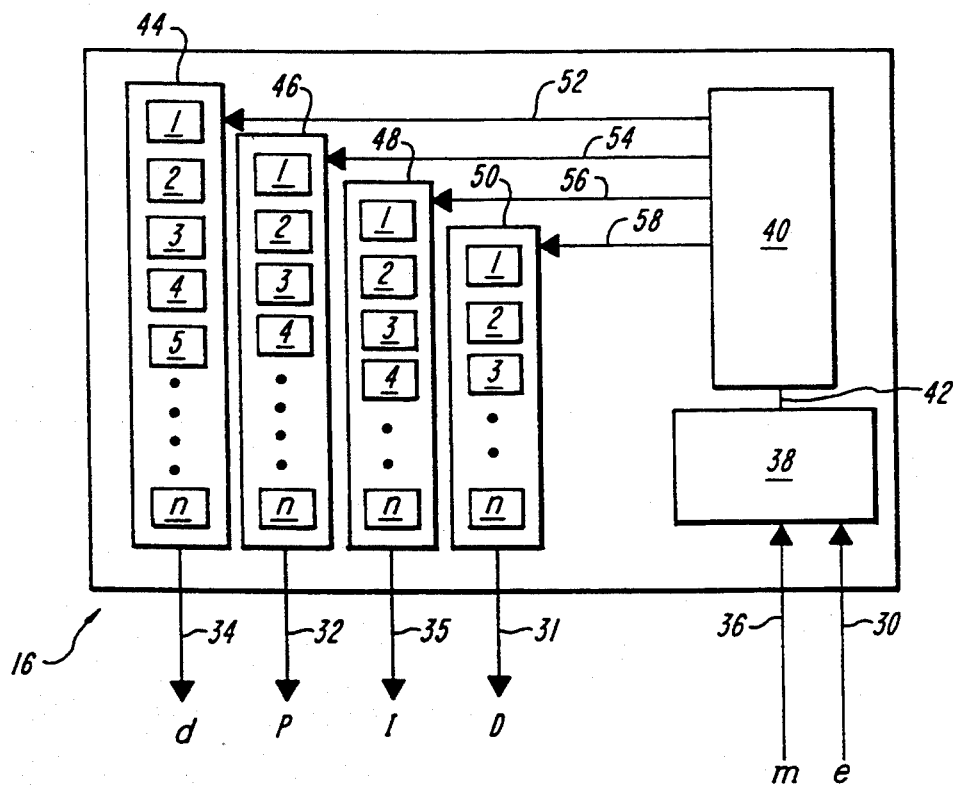
FIG. 1A illustrates a preferred self-tuning portion of the controller shown in FIG. 1.

FIG. 1A shows further features of the self-tuning section 16 illustrated in FIG. 1. The manipulated variable signal m, output from the controller 10, and the deviation error signal e, are input to the self-tuning section 16 signal via lines 36 and 30, respectively. The time waveforms of these signals are analyzed by the waveform analysis block 38 to determine certain characteristic features, e.g., period $\tau_o$, decay ratio $\delta$, recovery time $\theta$, and overshoot $\Omega$. A summary signal representative of these characteristics is then sent to the sub-selection block 40 via control line 42. This signal is interpreted by sub-selection block 40 to select a rule-holding block 44 or 46, via a corresponding rule control line 52 or 54. Rule holding blocks 44 and 46 contain tuning rules for use within the self-tuning deadtime controller 10. These tuning rules are classified into two categories, the Cycle tuning rules and the Peak-2 tuning rules, and are described in more detail below.

In operation, for example, sub-selection block 40 can interpret the summary signal from the waveform analysis block 38 as an indication of unacceptable oscillatory behavior in the manipulated variable signal m and thereby invoke rule-holding block 44, which contains rules which modify the deadtime parameter $\tau_d$. Rule-holding block 44 then activates one of many rule actuators 44 (1), 44 (2), 44 (3), 44 (4), 44 (5) . . . 44 (n), to iteratively modify the controller deadtime $\tau_d$ according to the rule associated with each actuator 44 (1)–44 (n). $\tau_d$-control line 34 communicates with the time-delay block 24 of FIG. 1 to alter the $\tau_d$ parameter of the integral-deadtime section 14. Similarly, the sub-selection block 40 can interpret the summary signal from the waveform analysis block 38 as an indication of unacceptable overshoot or recovery of the deviation error signal e and thereby invoke rule-holding block 46, which contains rules which modify the proportional band P. Rule-holding block 46 then communicates with sub-selection block 40 to activate one of its several rules (1)–(n), whenafter the self-tuning section 16 modifies the proportional band P associated with the PID block 11 of the controller 10 (FIG. 1) via the P-control line 32. Typically, one iteration of either $\tau_d$ or P is required to achieve nearly optimum performance, but more iterations of a single tuning rule or multiple rules are possible.

With respect to blocks 48 and 50, it is generally not required to tune I and D during process control activities. However, these blocks are used in the self-tuning section 16 to automatically adjust I and D according to their initial pre-tuning, and later in ratio relative to $\tau_d$. Furthermore, the blocks contain storage memory to house separate tuning rules should particular processes demand it in the future.

It should be understood that the self-tuning section 16 of FIGS. 1 and 1A are illustrative. The purpose of the invention is conveyed by reference to the FIGS. 1 and 1 A, and modifications are easily made without departing from the scope of the invention. As for example, individual tuning rules, as associated with rule-holding blocks 44 and 46, and as thoroughly described below in FIGS. 2–11, can be amended in accord with the teachings herein without departing from the scope of the invention.

Figure 2:
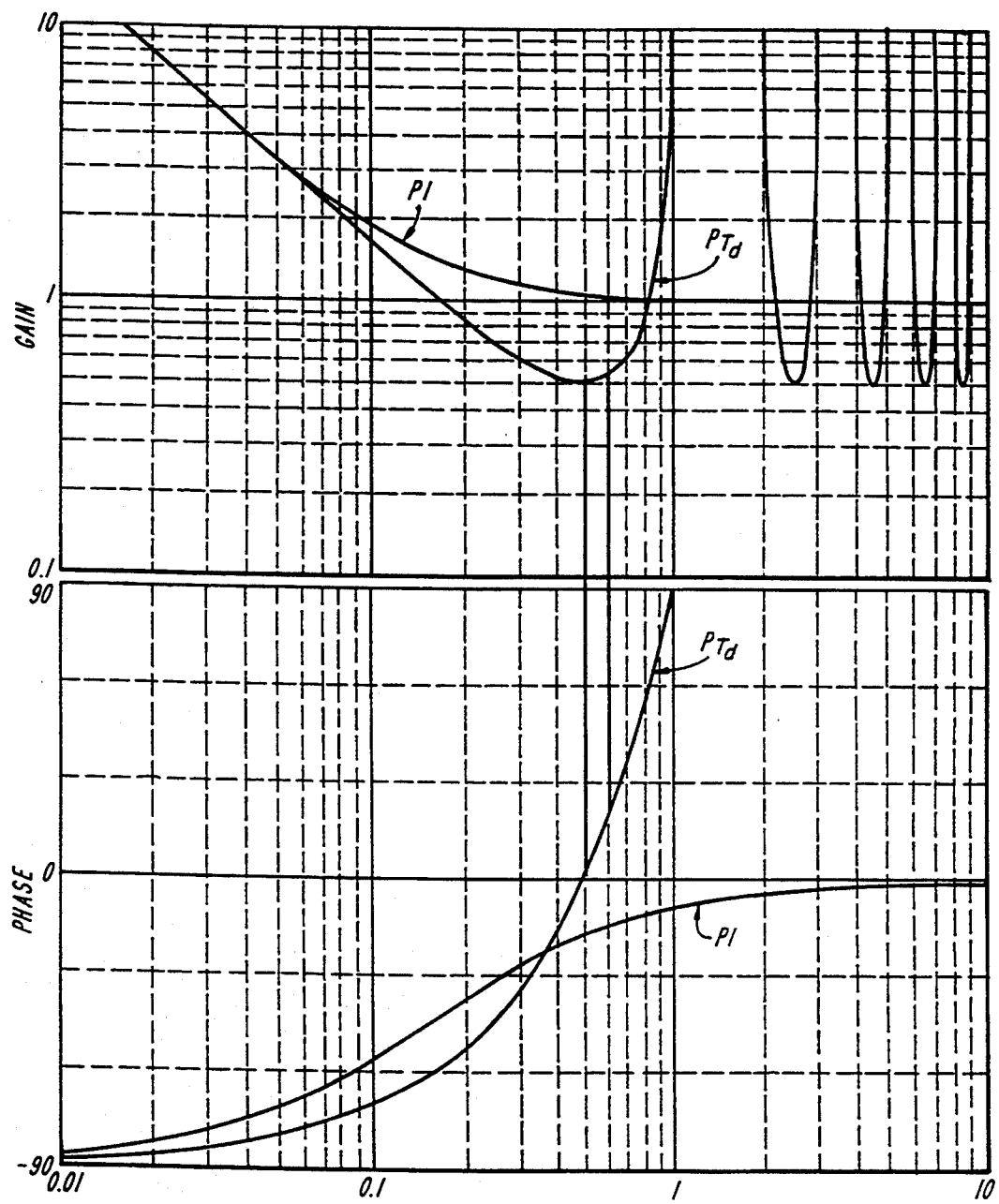
FIG. 2 illustrates an unfiltered gain and phase relationship for a traditional PI controller and a related deadtime controller.

FIG. 2 illustrates differences in gain and phase between a standard PI controller and one with deadtime, denoted by PI and P$\tau_d$ respectively. It shows the frequency response of the controller integration network and illustrates the benefits of deadtime controllers. The x axis of FIG. 2 is a frequency axis, relative to the deadtime controller time constant $\tau_d$. The upper graph shows controller gain characteristics, and the lower graph illustrates phase angle, which relates to the input and output waveform of the controller.

A deadtime controller is in many aspects better than the conventional PID controller. At the point of minimum gain, in the upper graph, the gain of the P$\tau_d$ controller is only 0.5. This occurs at a frequency of $0.5\tau_d$ (i.e., the period of the wave is $2\tau_d$), where most processes are expected to cycle. A user can, therefore, double the proportional controller gain, as compared to a PI controller gain, which always exceeds 1.0. The higher the proportional controller gain, the smaller the peak deviation between the setpoint level r and the controlled variable signal c following a process load disturbance. In addition, referring to the lower graph at $0.5\tau_d$, the P$\tau_d$ controller has zero phase-lag to reduce the overall period of control loop. Phase lead is preferable to negative phase, which the PI controller always exhibits, gradually approaching zero.

While these P$\tau_d$ features are preferable, the performance of a PI controller exceeds its P$\tau_d$ counterpart when operating outside the minimum gain region. A PI controller uses a ramp-type control response whereas a deadtime controller uses a staircase-type control response. Thus, in a PI controller, the gain at low frequencies is very high and as frequency goes up, the gain asymptotically reaches one. This is not true in a deadtime controller, where the gain rises steeply on each side of the minimum and as frequency increases, the P$\tau_d$ controller gain oscillates unacceptably. At the high frequencies, therefore, attenuation filtering is needed during operation. The raw data presented in FIG. 2 has no filter, to illustratively show this deadtime controller behavior.

Therefore, FIG. 2 shows that if the ratio of period-to-deadtime in a P$\tau_d$ controller is not close to 2, the loop gain can easily cause undamped or expanding oscillations, which are undesirable. The best performance is achieved when the ratio of period-to-deadtime falls between 1.7 and 2.2, which is between 0.5 and 0.6 on the frequency scale of FIG. 2. First order and multi-order lag-dominant processes were controlled experimentally, to make this determination.

Accordingly, the illustrated self-tuning deadtime controller 10 of FIG. 1, and, in particular, the self-tuning section 16, are capable of maintaining, or "tuning" the controller deadtime $\tau_d$ to the 0.5–0.6 frequency range of FIG. 2. Section 16 achieves this by modifying the controller deadtime $\tau_d$ on the basis of the measured manipulated variable signal waveform period $\tau_o$ particularly in accord with the mathematical relation shown in the Cycle Rules "$\tau 1.7$" and "$\tau 2.5$" below:

RULE "$\tau 1.7$"

If $\tau_o < 1.7 \, (\tau_d)$, then $\tau_d = \dfrac{\tau_o}{1.7}$

RULE "$\tau 2.5$"

If $\tau_o > 2(\tau_d)$, then $\tau_d = \dfrac{\tau_o}{c}$, where $c = 3 - \dfrac{1}{\tau_d}$ if $c > 2.5$, else $c = 2.5$ A deadtime controller operating in accord with Cycle Rules "$\tau 1.7$" and "$\tau 2.5$" maintains the output oscillatory wave period $\tau_o$ of the manipulated variable signal m in the minimum gain region of FIG. 2, i.e., the region on the P$\tau_d$ curve between the frequencies $0.5 \leq f^* \, \tau_d \leq 0.6$. If the deadtime controller operates outside the this region, gain increases and cycling can start, reducing the controller 10 robustness. Cycle Rules "$\tau 1.7$" and "$\tau 2.5$" therefore present the strongest self-tune methodology according to a preferred embodiment of the invention. It is initially related to data shown in FIG. 2, and its parameters can change; but, in general, Rules "$\tau 1.7$" and "$\tau 2.5$" assure that if the process operates outside the minimum gain region, the controller deadtime $\tau_d$ is modified according to these rules to optimize the high performance capability of the deadtime controller. If $\tau_o$ lies outside the desired region and the period is low, $\tau_d$ is adjusted to $\tau_o/1.7$ according to Rule "$\tau 1.7$". Similarly, if the period is high, $\tau_d$ is adjusted according to Rule "$\tau 2.5$".

Figure 3:
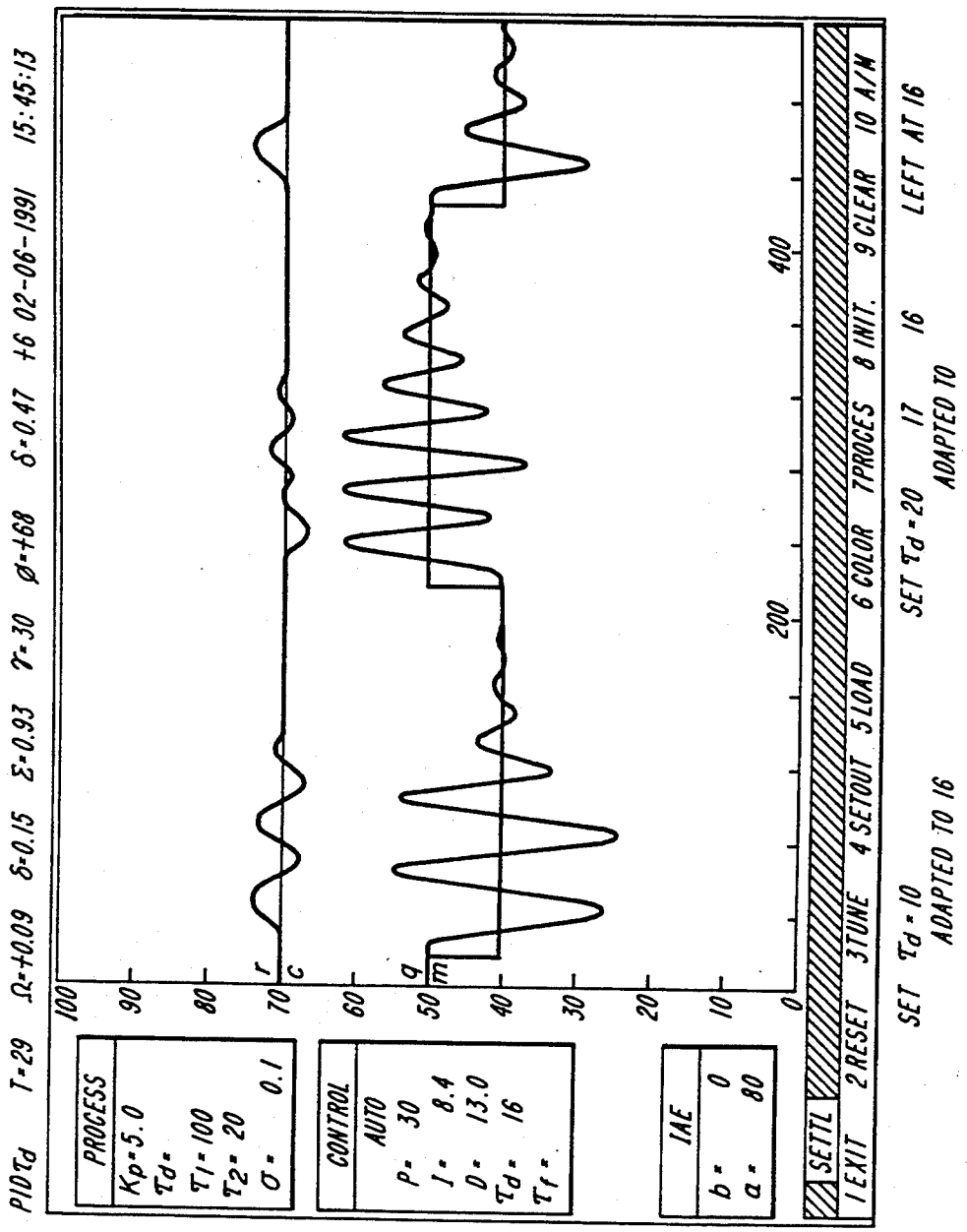
FIG. 3 illustrates a preferred primary self-tuning rule methodology according to the invention, where a controller deadtime is adjusted according to a cycling period of the manipulated variable signal.

FIG. 3 more particularly illustrates the collective operation of these primary Cycle Rules "$\tau 1.7$" and "$\tau 2.5$" in which the self-tuning section 16 adapts $\tau_d$ in a controlled, simulated process consisting of 20 interacting lags. FIG. 3 displays test results of the self-tuning deadtime controller forcing the controller waveform into the minimum gain region of FIG. 2. At the beginning of the test, all controller settings were optimum except for $\tau_d$, which was intentionally set at 10, as compared to the optimum value of 16. upon a step load disturbance, denoted by the variable q, an expanding oscillation began in the manipulated variable signal m (lower trace). At the end of one measured period, i.e., at the second downward peak, $\tau_d$ was corrected to 16 according to Cycle Rule "$\tau 2.5$", and stability was restored.

Then $\tau_d$ was manually reset to 20 and another load disturbance was inserted to the process. An expanding cycle again started, but one with a shorter waveform time period such that the Cycle Rule "$\tau 1.7$" was invoked. After one full period, the deadtime was reset to 17, restoring stability. Following another period, the controller was reset to the optimum deadtime of 16. The last test was performed with the deadtime $\tau_d$ left its optimal value at 16. No deadtime adjustment was thereafter necessary because the period fell within the mathematical limits of the Cycle Rules.

Referring again to FIG. 3, the variable "r" denotes the desired setpoint level of the process. The variables "c" and "m" represent, respectively, the controlled variable and manipulated variable signals. The variable "q" represents the diagnostic load disturbance added to the process under test. Collectively, "q" represents a disturbance to the process which forces the controlled variable away from set point "r", and in turn causes the manipulated variable signal "m" to change so that the controlled variable "c" converges to the setpoint level "r".

The tuning processes illustrated in FIG. 3 are done automatically. In the automatic mode, the manipulated variable signal is always monitored and interpreted for possible deadtime $\tau_d$ modifications. If required, $\tau_d$ is tuned at intervals of $2^* \tau_d$ to allow for an interpretation and response time. Stability is achieved by modifying $\tau_d$ towards the optimum minimum gain region of FIG. 2. In general, there are no such regions in the gain and phase-to-frequency relationships unless a process controller has deadtime in it. When the self-tuning block 16 (FIGS. 1 and 1A) interprets that the output waveform period of oscillation is outside the limits defined in Cycle Rules "$\tau 1.7$", and "$\tau 2.5$", the controller deadtime $\tau_d$ is accordingly adapted. Then, the self-tune section 16 measures another waveform period and changes $\tau_d$ again, if required.

Two more Cycle Rules, "$\tau \delta \uparrow$" and "$\tau \delta \downarrow$", are often required whenever a deadtime controller is used in conjunction with first-order processes. Because there is insufficient natural filtering, such a combination may produce unwanted high frequency cycling in the manipulated variable signal m. If the cycling is decaying, then re-tuning may not be required. But if the cycling is expanding, the controller must be re-tuned. Cycle Rules "$\tau \delta \uparrow$" and "$\tau \delta \downarrow$" are:

RULE "$\tau \delta \downarrow$"

$\tau_d = \dfrac{\tau_d}{[(1 + 0.67 \, (\delta - 0.8)]}$

RULE "$\tau \delta \uparrow$"

$\tau_d = \dfrac{\tau_d}{[1 - 0.83 \, (\delta - 0.95)]}$ where $\delta = \dfrac{\text{peak}(3) - \text{peak}(2)}{\text{peak}(1) - \text{peak}(2)}$ More particularly, if $\tau_o \leq \tau_d$, then the cycling is caused by a deadtime mismatch between the process and the controller, and the process under control is deadtime-dominant. Under such conditions, the direction of the mismatch is not discernible from the response and two possible solutions exist: the controller deadtime could be lower or higher than the process deadtime. The degree of mismatch can be estimated, however, because the decay a is a linear function of the ratio of $\tau_d$ to its optimum value for either case. Cycle Rule "$\tau \delta \downarrow$" initially changes $\tau_d$ according to one linear function, and if $\delta$ decreases, but is still too high, additional correction is made according to the same relationship (although the first correction should be sufficient). If the mismatch occurs in the opposite direction, δ will increase, in which case $\tau_d$ is then recalculated according to the other Cycle Rule "$\tau\delta \uparrow$". These two actions should reduce the decay δ to an acceptable level, although additional adjustments may be made if the decay is not small enough.

Figure 4:
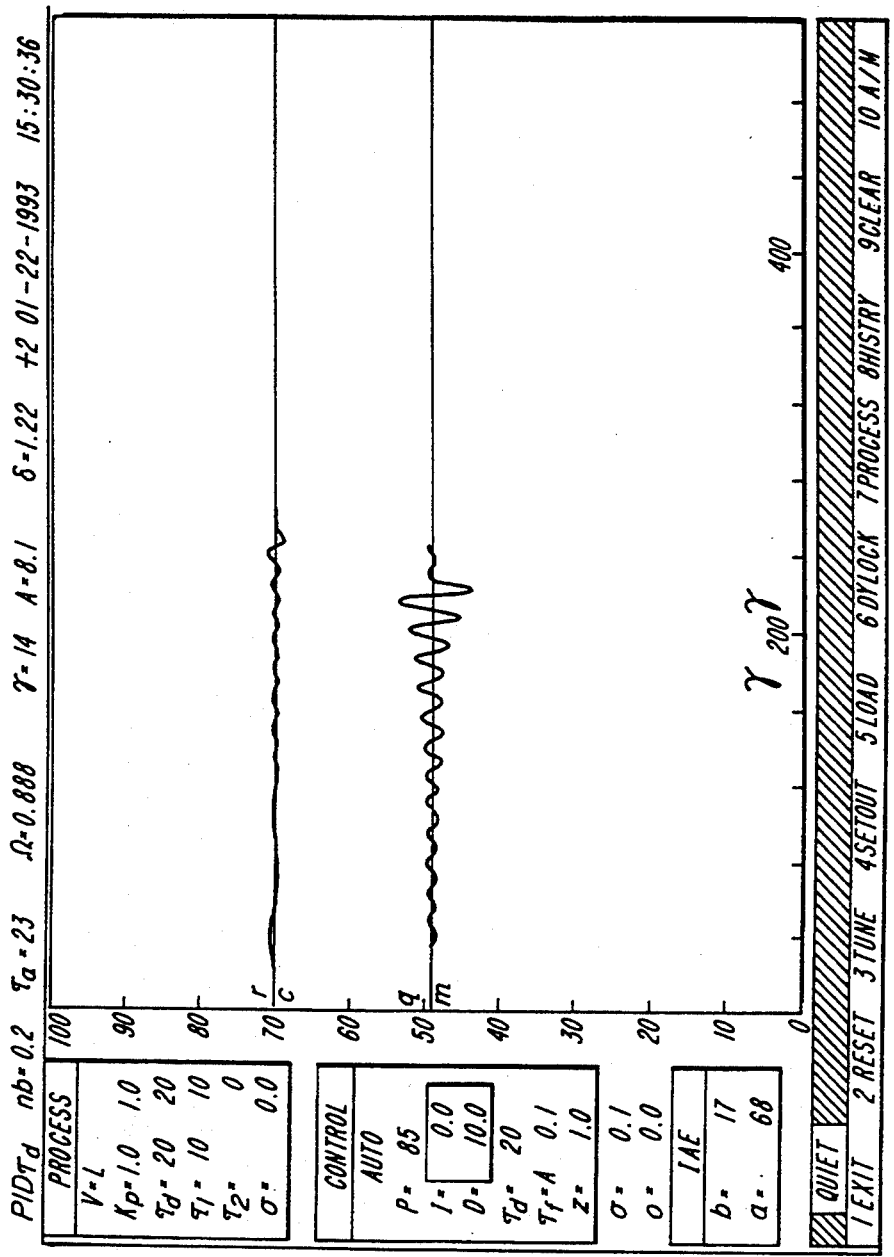
FIG. 4 graphically illustrates process and control data taken when a self-tuning deadtime controller according to the invention adapts a controller deadtime on the basis of expanding fast cycles in an output waveform.

The use of Cycle Rules "$\tau\delta \downarrow$" and "$\tau\delta \uparrow$" to tune a deadtime controller having a high frequency cycle in the manipulated variable signal m is partially illustrated in FIG. 4. The cycle is induced by intentionally setting $\tau_d$ to a low value. The first application of the Rule "$\tau\delta \downarrow$" decreased $\tau_d$ causing δ to rise; and a second adjustment was made in the opposite direction, according to Rule "$\tau\delta \uparrow$", thereby produced the optimum setting.

Specifically, the deadtime controller of FIG. 4 was tuned optimally except for its deadtime $\tau_d$, which was set at 16. Following a small step load input to the process, shown by the q trace, an expanding oscillation resulted with a period less than the deadtime. By adapting the controller deadtime according to Rule "$\tau\delta \downarrow$", the self-tuning section 16 moved $\tau_d$ downward as a function of the decay ratio δ. However, decreasing $\tau_d$ from 16 to 14 based on Rule "$\tau\delta \downarrow$" turned out to be incorrect which in turn caused δ to increase. Deadtime adaptation was then repeated using Rule "$\tau\delta \uparrow$", thereby readjusting $\tau_d$ to 20, its optimum value, and abating the cycle.

Figure 4A:
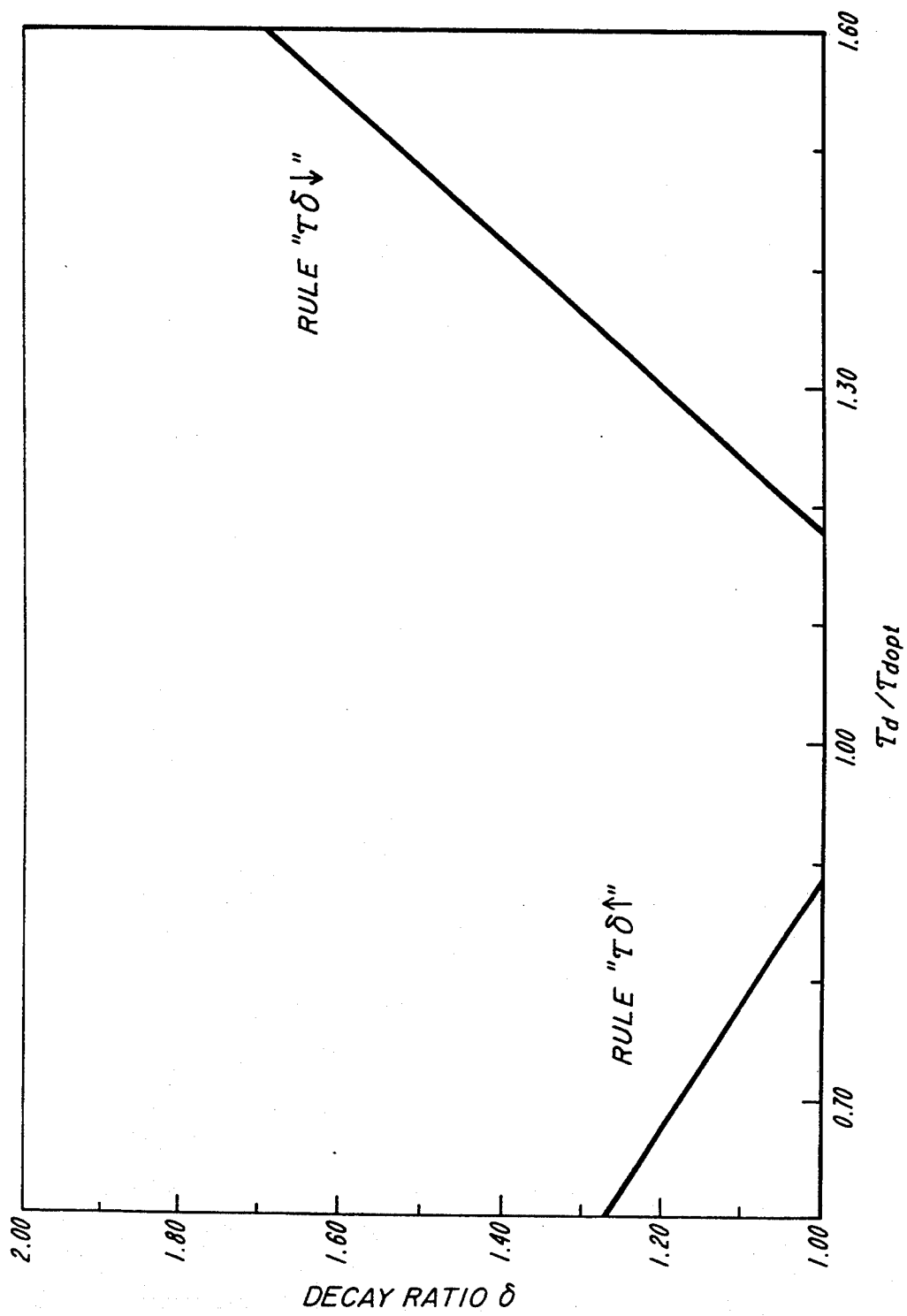
FIG. 4A represents preferred tuning rules used in FIG. 4 in a graphical illustration of decay ratio vs deadtime.

FIG. 4A shows the two linear relationships for the decay ratio δ as utilized in the Cycle Rules "$\tau\delta \downarrow$" and "$\tau\delta \uparrow$" of FIG. 4. δ is graphed as a function of $\tau_d$, either increasing or decreasing with Cycle Rules "$\tau\delta \downarrow$" or "$\tau\delta \uparrow$" respectively. An assumption is made, as in FIG. 4, that the deadtime $\tau_d$ is too high. The optimum value of $\tau_d$ is then calculated as a function of δ and the line on the right side of FIG. 4A is invoked, i.e., Cycle Rule "$\tau\delta \downarrow$". If the assumption is correct, the cycling of the manipulated variable signal cycle should decay. If incorrect, however, δ will increase further. After the control loop has had time to respond, the resulting δ is compared against the previous value. If δ has increased, then Rule "$\tau\delta \uparrow$", as represented by the line on the left side of FIG. 4A, is invoked, adjusting $\tau_d$ in the opposite direction.

Generally, if an oscillation develops in the control loop because of mistuning, it will appear first in the controller output manipulated variable signal m. Therefore, the signal m is continuously monitored by the self-tuning section 16 for the presence of oscillation. Cycled variations in m above a minimum threshold are stored as maximum and minimum (peak) values for purposes of estimating the period $\tau_o$ and decay ratio δ. These values are screened for their information content as a function of the number of peaks observed, their amplitude and decay ratio, and their regularity. A cycle can be recognized after only two peaks, if it is both expanding and of sufficient amplitude. The period $\tau_o$ is estimated as 2.07 multiplied by the time between the peaks, and δ is estimated as 0.8 times the ratio of the difference between successive peaks, i.e., Peak 2 and Peak 1, to the difference between the initial value of m and Peak 1. Otherwise three peaks are used in the estimates of $\tau_o$ and δ: $\tau_o$ is estimated as the difference in time between Peaks 1 and 3; and δ is estimated as the ratio of the difference between Peaks 1 and 2 as compared to the difference between Peaks 3 and 2. If the decay ratio δ exceeds the limit allowed for that loop, the information is interpreted by the self-tuning section 16 to induce the Cycle class of tuning rules: "$\tau 2.5$", "$\tau 1.7$", "$\tau\delta \uparrow$" and "$\tau\delta \downarrow$".

Figure 5:
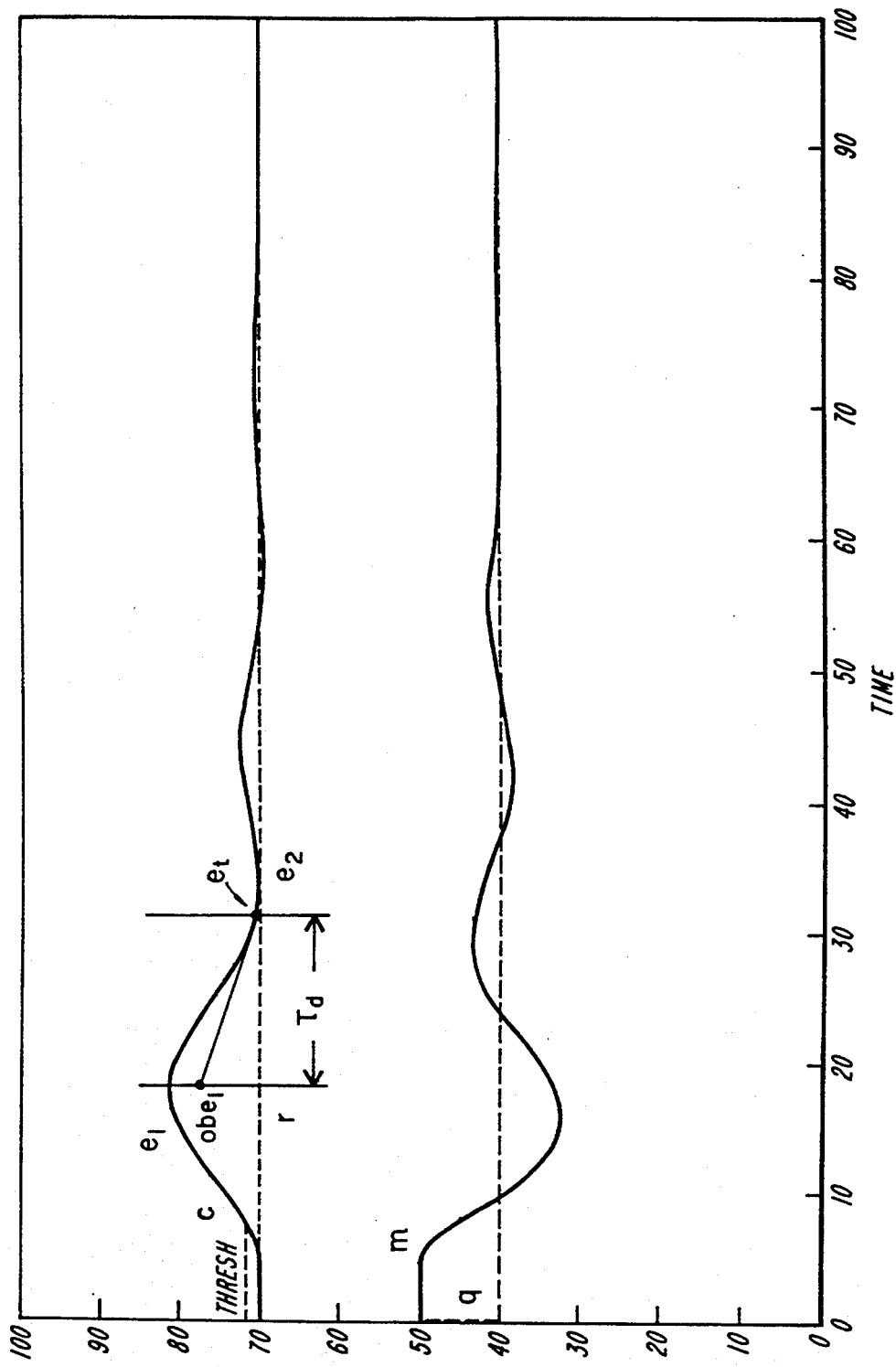
FIG. 5 graphically illustrates a preferred method of determining overshoot and recovery time following a step change in load input to a process.

As mentioned earlier, the other class of tuning rules includes the Peak-2 Rules, which correspond to measurements in the deviation error signal e. FIG. 5, for example, illustrates the measurements of Ω and θ from an analysis of the controlled variable signal response due to a step change in load. After the deviation error signal e exceeds a threshold value, a search is conducted for the first waveform peak, $e_1$, whose amplitude and time are noted. After an elapsed time of $\tau_d$ following the measurement of $e_1$, a second waveform Peak $e_2$ is measured and thereafter used to estimate the dimensionless recovery time θ. The recovery time is the time expected for the deviation to return to zero, divided by $\tau_d$. The time is estimated by projecting a straight line from a point 0.6 $e_1$ through the point $e_t$ to the zero axis. Mathematically, θ is calculated as:

$$\theta = \frac{1}{(1 - e_t/0.6e_1)}$$

As shown in FIG. 5, for example, $e_t$ is approximately zero, so θ is approximately 1.0, which is ideal for many processes.

The calculation of recovery θ is useful in determining whether an overshoot is caused by an improperly tuned proportional band P, or the deadtime $\tau_d$. More particularly, excessive values of the proportional band P induce excessive values of θ, while insufficient values induce low insufficient values of θ in addition to overshoot. As a quantity, overshoot Ω is calculated as the ratio of the first two peaks once the second peak is isolated i.e., $$\Omega = \frac{-e_2}{e_1}$$

After the quantities Ω and θ are determined, the Peak-2 Rules are applied, if required, as described in FIGS. 6, 7 and 9-11.

Figure 6:
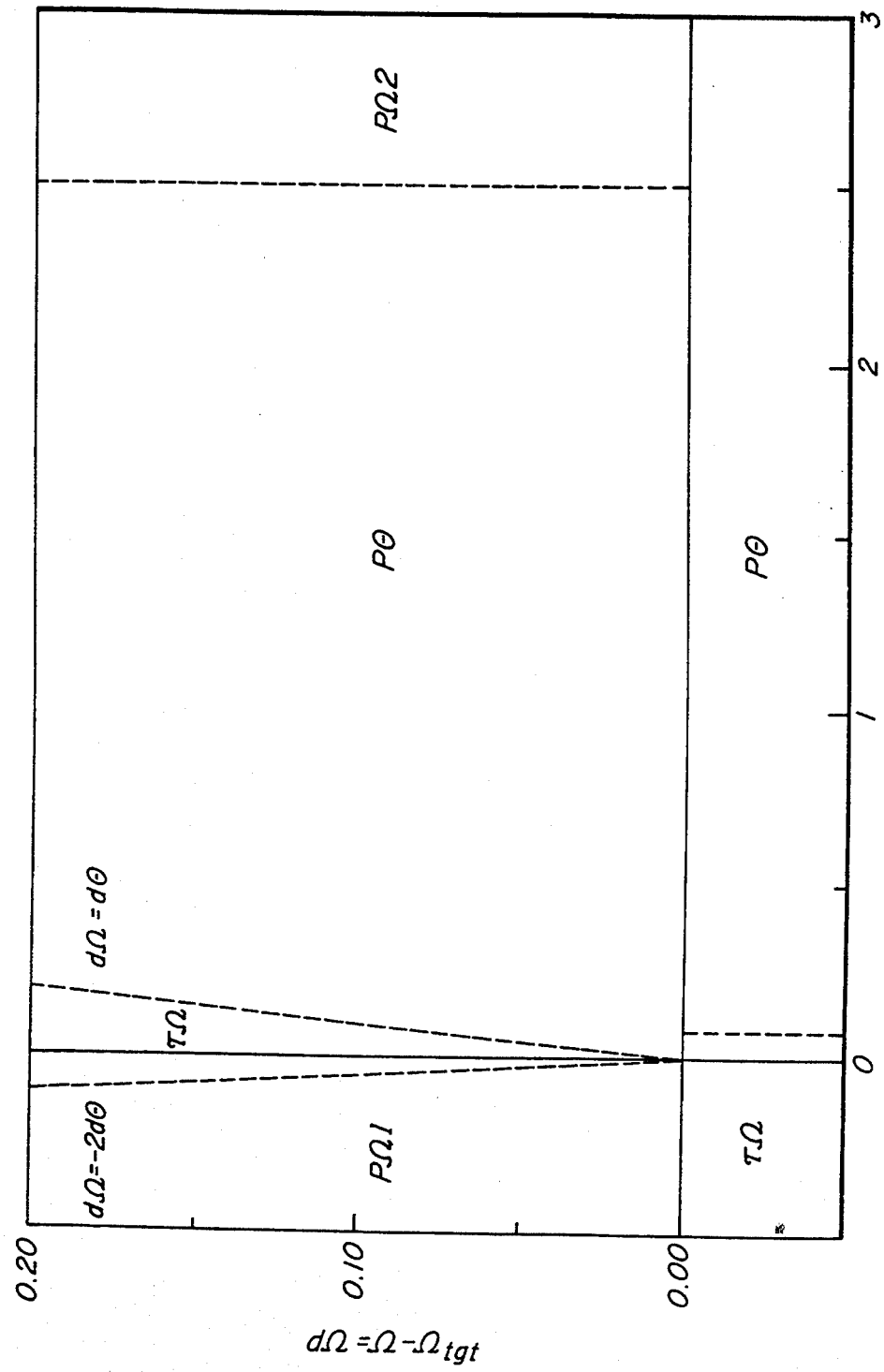
FIG. 6 graphically illustrates a preferred method for selecting tuning rules based upon errors in overshoot and recovery time.

FIG. 6 divides up the error domain for Ω and θ in the application of different Peak-2 tuning rules. The wedge area above zero Ω error and between the lines $d\Omega = -2d\theta$ and $d\Omega = d\theta$ identifies a region of excessive overshoot that is caused by an insufficient controller deadtime $\tau_d$. If the measured characteristics of the deviation error signal e fall within this region, a $\tau_d$ correction is applied as a function of Ω in the "$\tau\Omega$" Rule given below. For negative error values of Ω with values of θ less than 0.1, the same rule applies. Peak-2 Rule "$\tau\Omega$" is operatively illustrated in FIG. 7.

Figure 11:
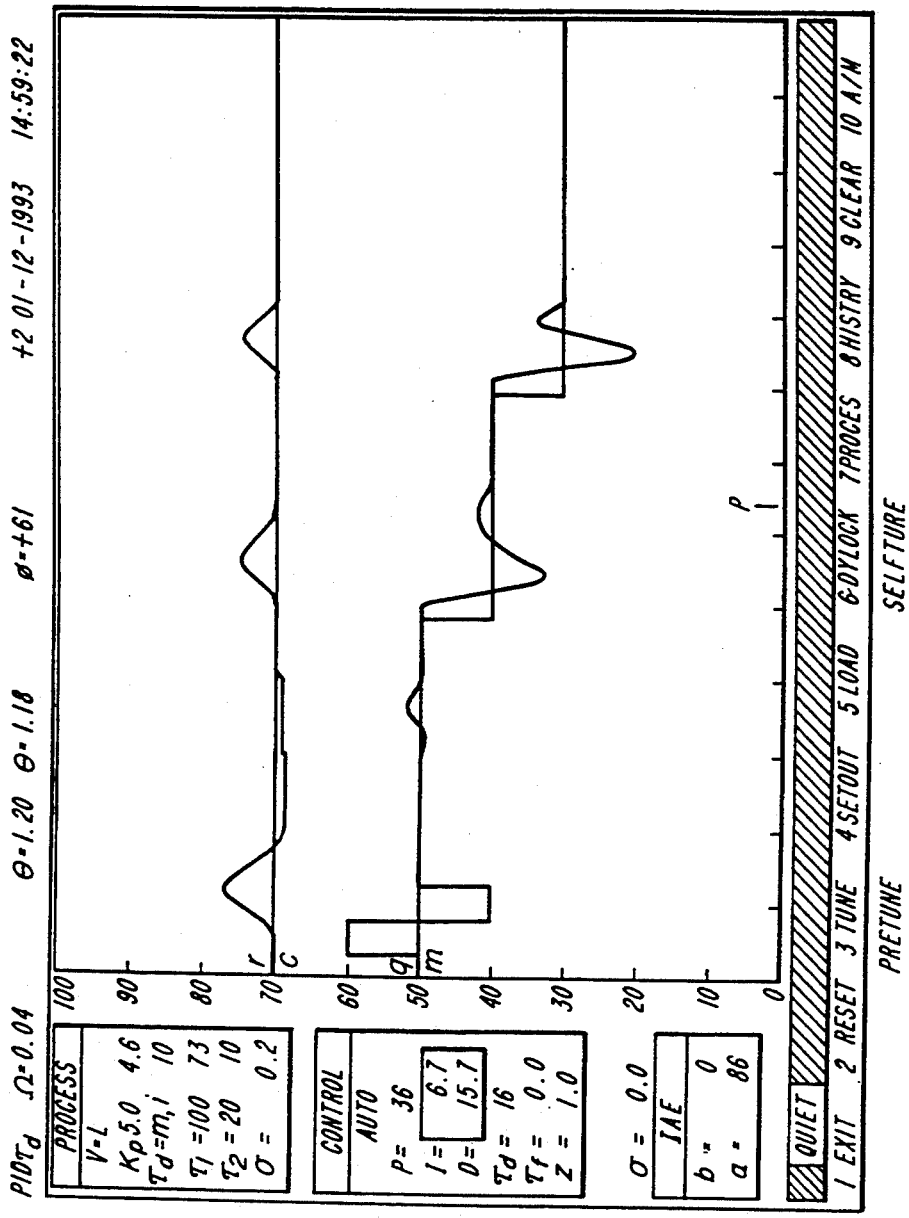
FIG. 11 graphically illustrates process and control data taken when a self-tuning deadtime controller according to the invention adapts a controller proportional band to correct for an excessive recovery time in a process consisting of 20 equal interacting lags.

The remaining regions shown in FIG. 6 are functions of other Ω and θ errors. For example, to the left of the "$\tau\Omega$" Rule wedge area characterizes a region of excessive overshoot due to insufficient values of the proportional band P. Thus, in this area, P is adjusted upwards as a function of Ω using the Peak-2 Rule "$P\Omega 1$". Similarly, to the right of the "$\tau\Omega$" Rule wedge area, correction to P is made as a function of θ using the Peak-2 Rule "$P\theta$", which is illustrated in FIG. 11. For the last region on the far right side of FIG. 6, that area shows both an excessive overshoot and a θ error beyond 2.5, and is corrected as a function of Ω using the Peak-2 Rule "$P\Omega 2$", which reduces excessive values of P.

Figure 7:
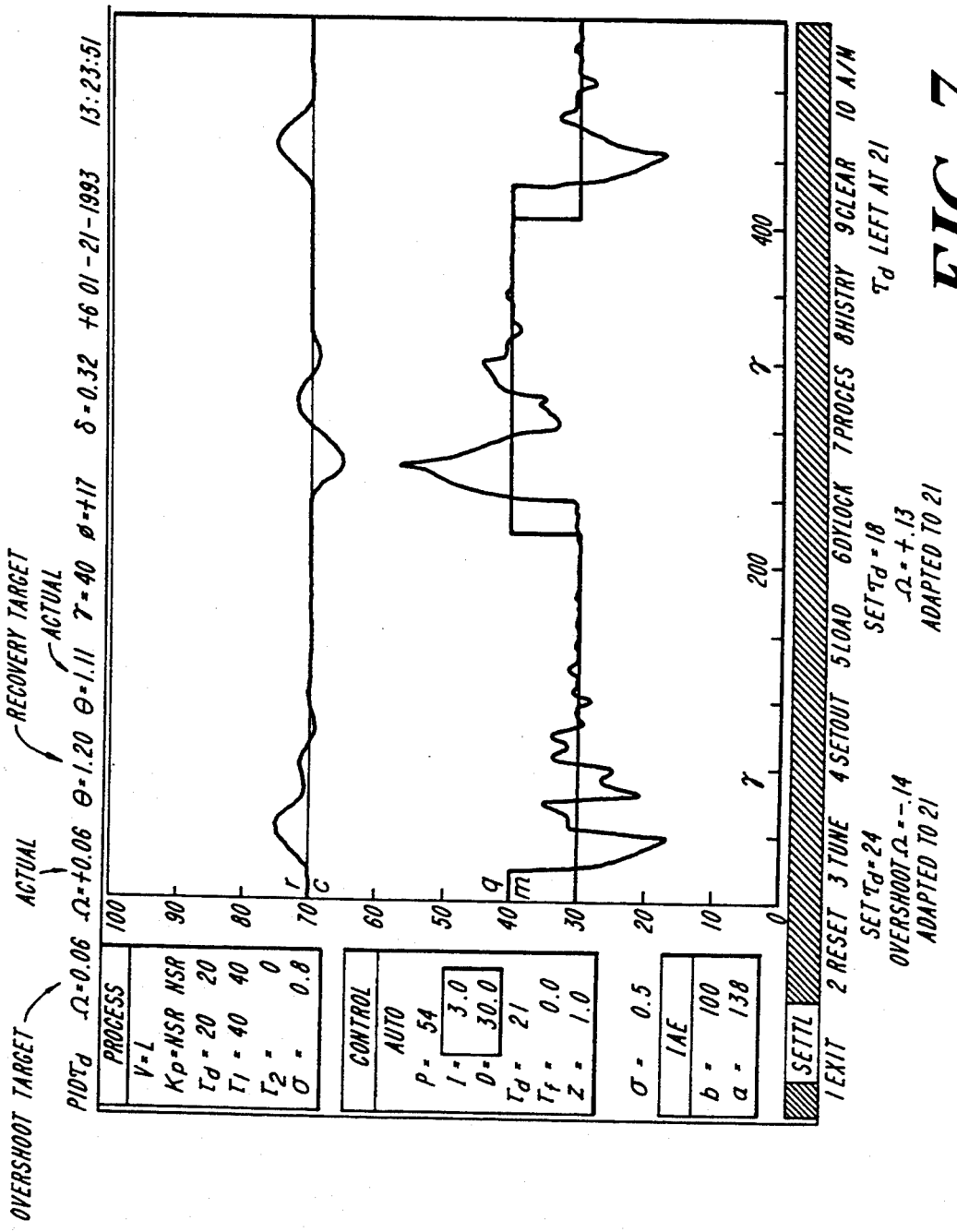
FIG. 7 graphically illustrates process and control data taken when a self-tuning deadtime controller according to the invention adapts a controller deadtime on the basis of too little and too much overshoot in a controlled variable signal.

FIG. 7 graphically illustrates process and control data taken when a self-tuning deadtime controller adapts $\tau_d$ first when it is intentionally set too high, and then when it is intentionally set too low, by adapting $\tau_d$ on the basis of the Peak-2 Rule "$\tau\Omega$":

RULE "$\tau\Omega$"

$$\tau_d = \tau_d[1 + k_1(\Omega - \Omega_{tgt})]$$

where $k_1 = 0.6$ if $D > 0$, else $k_1 = 1$

The deadtime controller was optimally tuned except for deadtime $\tau_d$ set at 24, which caused an undershoot $\Omega$ of $-0.14$. Rule "$\tau\Omega$" increased $\tau_d$ to the optimum value of 21. Deadtime $\tau_d$ was then reset manually to 18 in the middle of the graph, which caused a subsequent and excessive overshoot. Rule "$\tau\Omega$" thereafter reset $\tau_d$ to 21, which in the last part of FIG. 7 produced an overshoot of 0.06, which is on target.

Figure 8:
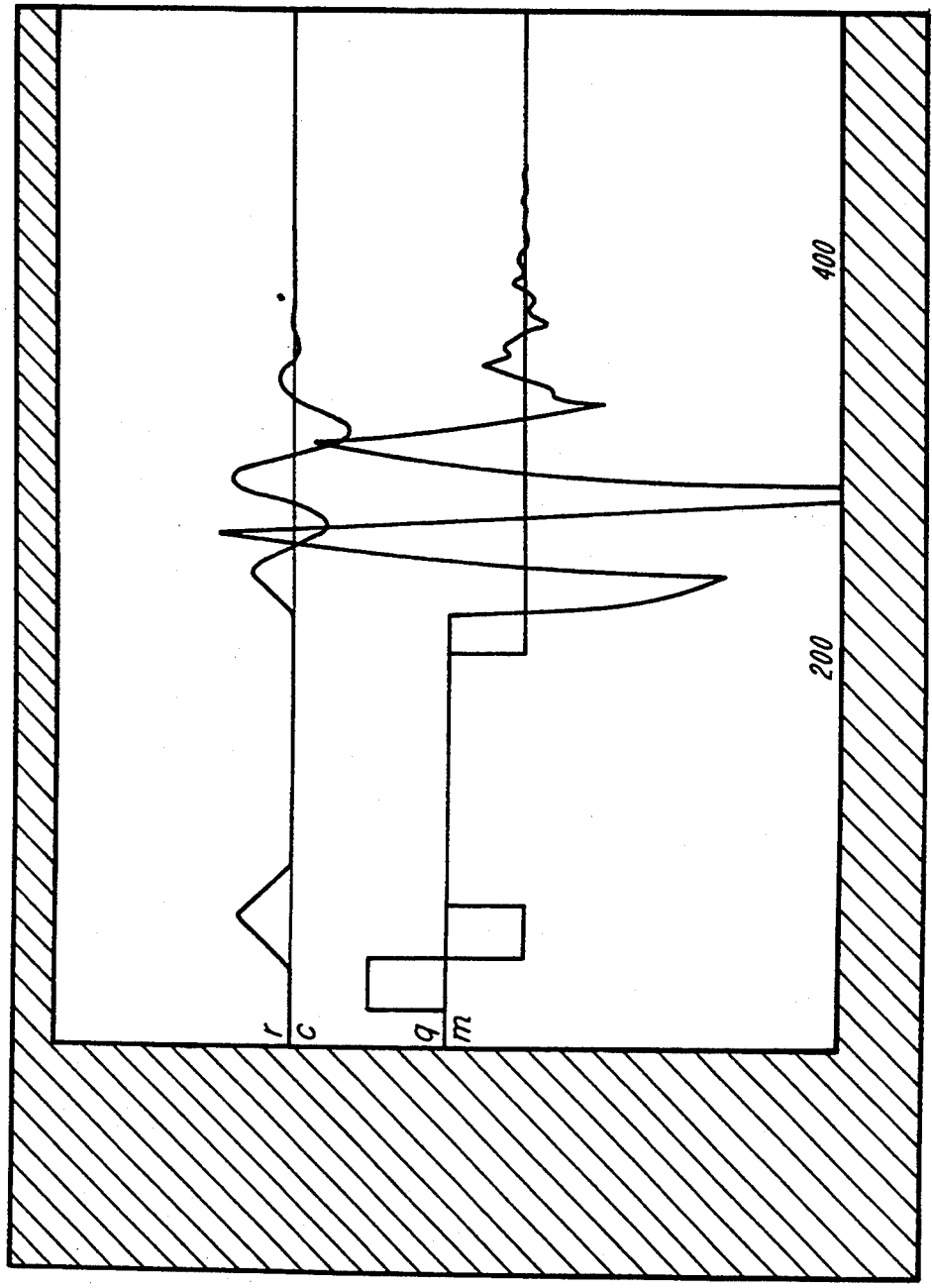
FIG. 8 graphically illustrates process and control data taken when a self-tuning deadtime controller according to the invention adapts a controller proportional band to acquire a target decay ratio in an output waveform.

FIG. 8 shows an oscillation caused by a misadjustment of the proportional band P from the correct value of 54% to 35%. The decay ratio $\delta$ of the output was measured for the first full cycle and then compared with the desired or target decay ratio for that process. The target decay ratio for non-self-regulating processes (such as shown in FIG. 8) and lag-dominant processes is approximately 0.45. If the observed decay is outside the limits 0.3 to 0.6, the proportional band P is adjusted by the self-tuning section 16 according to Rule "P$\delta$":

RULE "P$\delta$"
$$P = \frac{P(1 + \delta)}{(1 + \delta_{tgt})}$$

By operation of Rule "P$\delta$" as illustrated in FIG. 8, the proportional band P is adjusted to the Peak-2 correct value of 54%. No deadtime rules in FIG. 8 were invoked because the cycle period fell within the desired periodic band, i.e., the optimum minimum gain region of FIG. 2.

Figure 9:
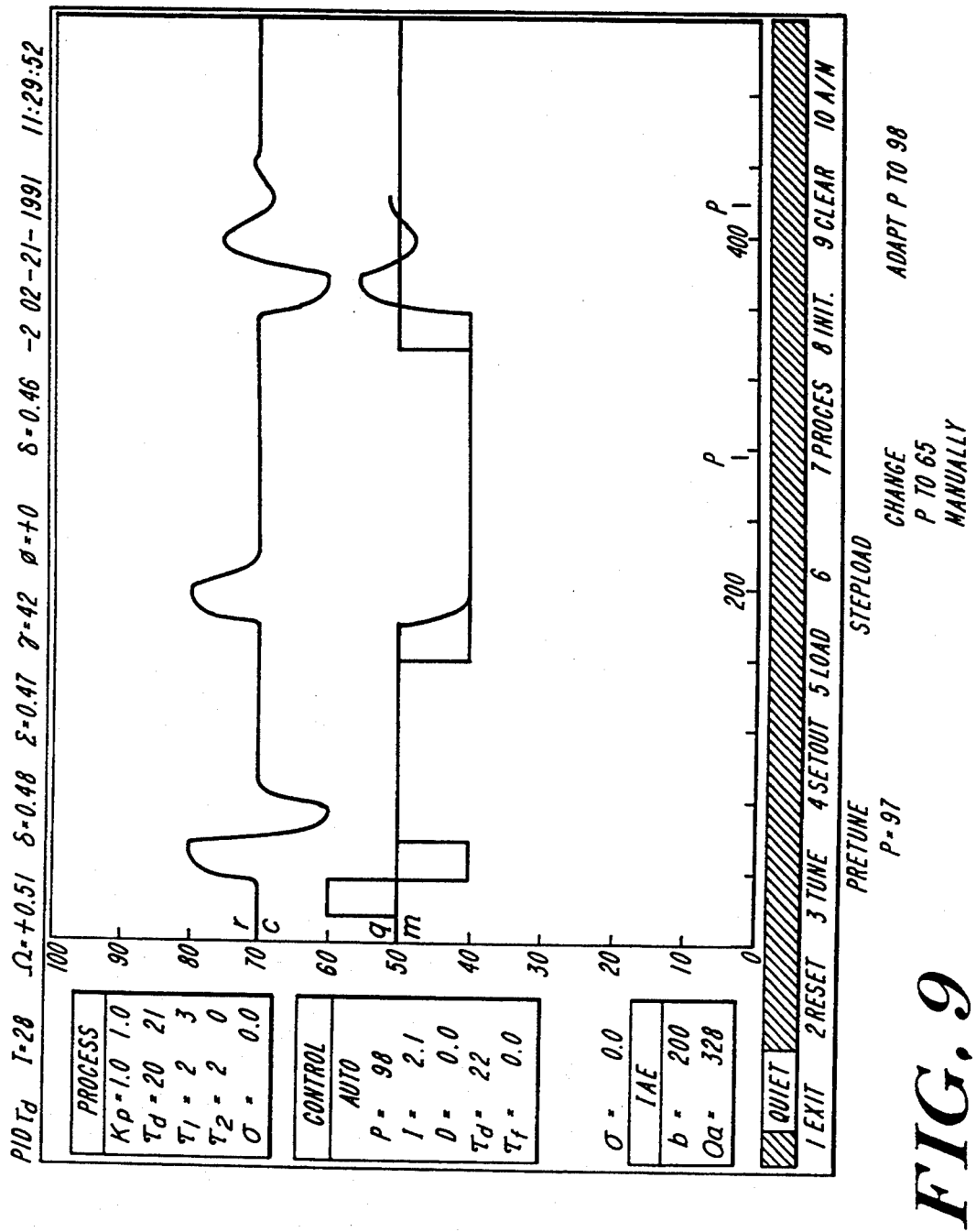
FIG. 9 graphically illustrates process and control data taken when a self-tuning deadtime controller according to the invention adapts a controller proportional band to correct an for overshoot in the controlled variable signal in a deadtime dominant process.

In FIG. 9, a properly tuned deadtime controller monitors a process that is almost entirely deadtime, with a resulting 97% proportional band P. A step load change introduced to the process shows that the controller was tuned correctly. The proportional band was then manually reduced to 65%, causing an overshoot at the next load change. By observing this overshoot, the proportional band was adapted back to 98% by the self-tuning section 16 according to the following Rule "P$\Omega$0":

RULE "P$\Omega$"

$$P = P(1 + \Omega)$$

Figure 10:
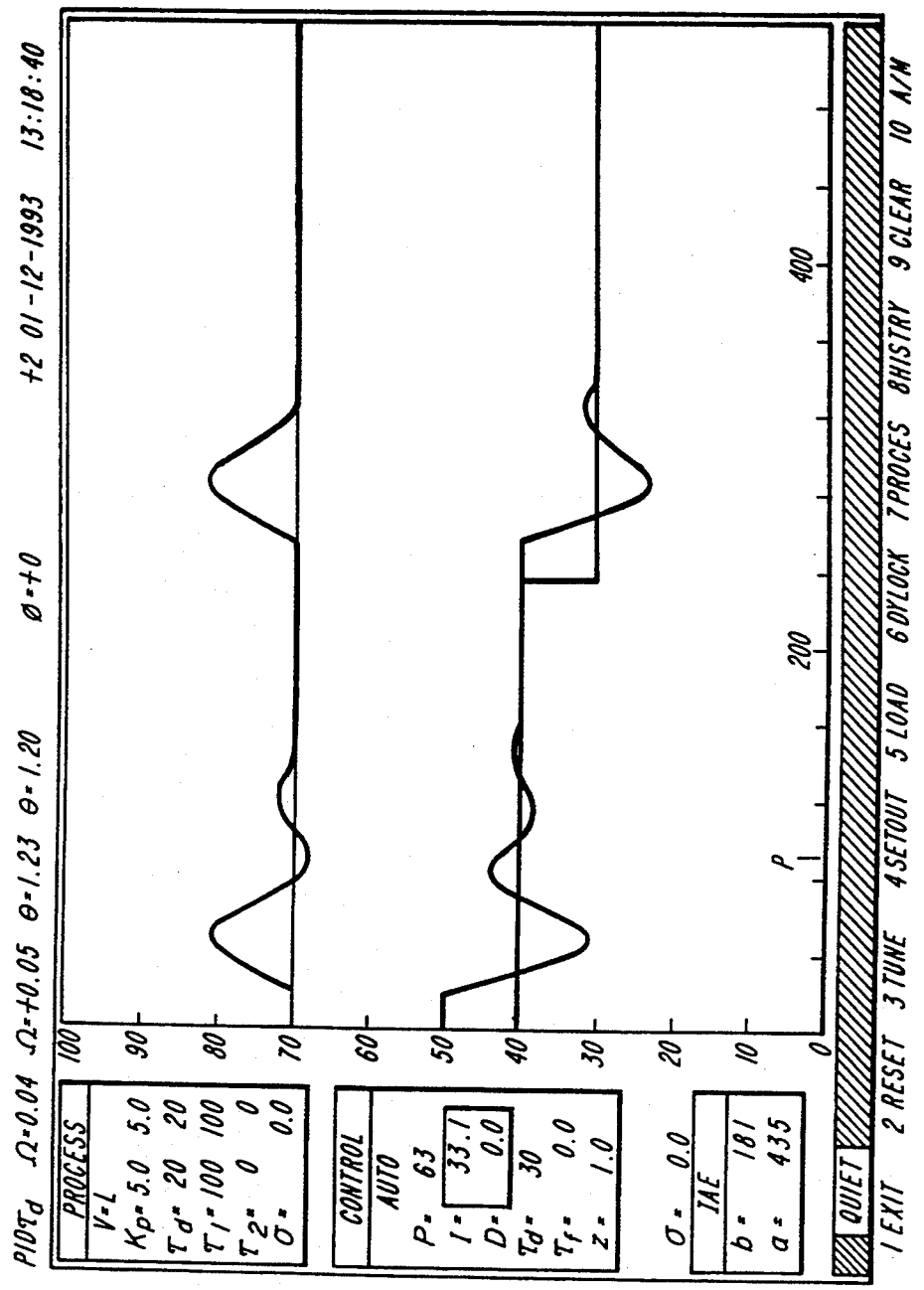
FIG. 10 graphically illustrates process and control data taken when a self-tuning deadtime controller according to the invention adapts a controller proportional band to correct for an overshoot in the controlled variable signal in a lag-dominant process.

As discussed with respect to FIG. 6, excessive overshoot to the left of the "$\tau\Omega$" wedge area is caused by an insufficient value of proportional band P. Thus in this region, P is adjusted as a function of $\Omega$ using the Peak-2 Rule "P$\Omega$1". FIG. 10 illustrates the application of Rule "P$\Omega$1":

RULE "P$\Omega$1"

$$P = P(1 + \Omega - \Omega_{tgt})$$

Initially, with reference to the graph in FIG. 10, the controller was tuned optimally except that P was too low at 55%, causing an overshoot $\Omega$ of 0.19 that exceeded the target mark of 0.04. Recovery $\Omega$ was 0.96 below the target of 1.23 and therefore coincided with the "P$\Omega$1" Rule domain of FIG. 6. The role reset P to 63%, reducing $\Omega$ for the next load response to 0.05 and raising $\theta$ to 1.20, both closer to target.

To the right of the "$\tau\Omega$" wedge area in FIG. 6, correction to the proportional band is made as a function of $\theta$ using the Peak-2 Rule "P$\theta$":

RULE "P$\theta$"

$$P = \frac{P}{[1 + k_2(\theta - \theta_{tgt})^{1.5}]}$$

where $k_2 = 0.5 \left(1 + \dfrac{\tau_2}{\tau_d}\right)(1 - T)$ and $$T = \frac{\tau_d}{(\tau_d + \tau_1 + \tau_2)}$$

Rule "P$\theta$" takes into account the fact that the relationship between P and $\theta$ is nonlinear and varies with the relative amount of deadtime $\tau_d$ in the process response. The factor T is the deadtime $\tau_d$ divided by the sum of the process deadtime and lag. FIG. 11 illustrates the application of Peak-2 Rule "P$\theta$" in a situation where improper pretuning resulted in an excessive P value and a $\theta$ value of 1.52, as compared to a target of 1.20. Using the "P$\theta$" Rule, it was retuned, bringing the next calculation of $\theta$ to 1.18.

With respect to the last region on the far right of FIG. 6, the domain of Peak-2 Rule "P$\Omega$2" is shown:

RULE "P$\Omega$2"

$$P = \frac{P}{(1 + 6\Omega)}$$

The rule is invoked when excessive overshoot develops beyond a $\theta$ error of 2.5, as caused by excessive values of P, and which are corrected by adapting P as a function of $\Omega$ using the "P$\Omega$2" Rule. The rule only applies if the derivative parameter D is greater than zero.

The foregoing describes methods and apparatus for tuning a deadtime controller during process control activities, such as retuning the deadtime $\tau_d$ and proportional band P according to characteristics of the manipulated variable signal m and the deviation error signal e. These methods and apparatus provide the simplicity, accuracy and effectiveness demanded by the art.

A further understanding of the construction and operation of the self-tuning deadtime controller described above may be attained by reference to the Appendix, which provides a software listing of preferred subroutines to monitor and analyze certain of the signals utilized by a controller constructed according to the invention. In reviewing that software listing, it will be appreciated that it applies to a simulated controller and process. As such, the variable "t" is not real-time but, rather, is the number of iterations since the start of the run.

Those skilled in the art will appreciate that the illustrated embodiment is exemplary, and that other embodiments incorporating additions and modifications to that described above fall within the scope of the invention. For example, tuning rules can vary or expand to meet the needs of particular processes under control. Furthermore, the self-tuning deadtime controller can easily be adapted to additionally adjust the controller's integral parameter I and the derivative parameter D, similar to the way in which P and $\tau_d$ were adapted during the process control examples above. Alternatively, the self-tuning section 16 of FIG. 1 can be connected to control and adapt every parameter in the deadtime controller, e.g., I, P, $\tau_d$ and D, either in a real-time fashion, or in pretuning the controller. If used in pretuning, for example, one or more of these parameters can also be "locked", e.g., I and D, prior to operational process control activities, whereinafter the self-tuning section 16 adapts only the parameters P and $\tau_d$ as described above.

APPENDIX

```
SUB SelfTune STATIC .

IF t < 2 THEN AdaptTim = -3 * Tc

MonitorSetPoint:
  IF diag < 2 AND ptun = 0 THEN
    monitor = 0: AdaptTim = 0: Tinhib% = 0
    diag = 2: Tune$ = "Quiet": CALL TuneDisplay(0, " Auto ")
    rl = r: thresh = 2: upset$ = "": EXIT SUB 'initialize set point
  END IF
  IF ABS(r - rl) > thresh THEN
    upset$ = "set": Tim(1) = t: sign = SGN(rl - r): r0 = rl: diag = 3
    IF sign < 0 THEN Tune$ = CHR$(24) + "Set " ELSE Tune$ = CHR$(25) + "Set "
    CALL TuneDisplay(0, " Auto "): what = History(0, Tune$, t)
    Peak = 1: Peak(1) = rl - r: monitor = 0: settle = 0
    Peak(2) = 0: Peak(3) = 0: Tim(2) = 0: Tim(3) = 0
  END IF
  rl = r
  IF diag = 1 THEN monitor = 0: diag = 2: Pinhib% = 1: Rule$ = "" 'start ReTune
  Outnb = nb * 100 / P: IF Outnb < 1 THEN Outnb = 1

GOSUB MonitorOutput
  IF Tune$ = "Cycle" AND monitor THEN EXIT SUB

Diagnostics:
  IF upset$ = "set" THEN COLOR 6 ELSE COLOR 5
  LOCATE 1, 57
  IF sign = 0 THEN PRINT USING " #"; diag ELSE PRINT USING "+#"; sign * diag
  COLOR 1
SELECT CASE upset$
  CASE "set"
    IF ABS(cv - r0) > thresh AND diag = 3 THEN 'start search
      diag = 4: LOCATE 1, 7: PRINT SPC(53); 'clear display
      COLOR 6: LOCATE 1, 7: PRINT USING "Ω=#.##"; OvsTgt
      LOCATE 1, 22: PRINT USING "Θ=#.##"; ThetaTgt: COLOR 1
      difl = cv - r: Decay = 0: Ovs = 0: Rec = 1: Theta = 0 'initialize
    END IF
  CASE ELSE 'load
    IF diag <= 3 OR (diag = 6 AND Tune$ <> "Cycle") THEN 'look for upset
      IF ABS(cv - r) > 2 * nb AND diag <> 3 AND t - Tim(5) > Tc THEN
        sign = SGN(cv - r): diag = 3: ' IF t - Tim(0) > Tc / 2 THEN Tim(0) = t
        .settle = 0: ' monitor = 0
        IF sign < 0 THEN Tune$ = CHR$(24) + "Load" ELSE Tune$ = CHR$(25) + "Load
"
        CALL TuneDisplay(0, " Auto "): upset$ = "load": ' what = History(0, Tune
$, t)
        FOR j% = 1 TO 3: Peak(j%) = 0: Tim(j%) = 0: NEXT j%: difl = 0
      END IF
      IF ABS(cv - r) > thresh AND diag <> 4 THEN 'upset verified
        sign = SGN(cv - r): diag = 4
        LOCATE 1, 7: PRINT SPC(53); 'clear display
        COLOR 6: LOCATE 1, 7: PRINT USING "Ω=#.##"; OvsTgt
        LOCATE 1, 22: PRINT USING "Θ=#.##"; ThetaTgt: COLOR 1
        Decay = 0: Ovs = 0: Peak = 0: Rec = 1: Theta = 0 'initialize
        FOR j% = 1 TO 3: Peak(j%) = 0: Tim(j%) = 0: NEXT j%: difl = 0
      END IF
    END IF
END SELECT
SELECT CASE diag
```

```
    CASE 2 'Quiet
      Peak(1) = 0: IF ABS(cv - r) < nb THEN Dev0 = cv - r: Tim(0) = t
      thresh = 2 * nb: IF thresh < 2 THEN thresh = 2 '2% or more
    CASE 3 'upset
      IF (cv - r) * sign < nb AND t - Tim(0) > 2 * Tc THEN 'insignificant upset
        diag = 2: Tune$ = "Quiet": CALL TuneDisplay(0, " Auto "): monitor = 0: Tin
hib% = 0
      END IF
    CASE 4 'load change
      GOSUB SelfPeak
      IF (cv - r) * sign < nb THEN 'recovered
        diag = 5: Dev5 = cv - r
        RecTim1 = (t - Tim(1)) * Peak(1) / (Peak(1) - Dev5) 'recovery basis
      END IF
    CASE 5 'recovered
      GOSUB SelfPeak
    CASE 6 'settling
      IF t > Tim(5) + 2 * (Tim(1) - Tim(0)) THEN
        diag = 2: Pinhib% = 0: Tinhib% = 0: upset$ = "": monitor = 0
        Tune$ = "Quiet": CALL TuneDisplay(0, " Auto ")
      END IF
  END SELECT Recovery:
  IF t - Tim(1) >= Tc AND Rec = 1 AND Peak THEN
    Rec = dif / Peak(1)
    IF Rec < .6 THEN Theta = 1 / (1 - Rec / .6) ELSE Rec = .6
    LOCATE 1, 29: COLOR 9: PRINT USING "O=#.##"; Theta: COLOR 1
  END IF Settling:
  IF diag > 4 THEN 'look for end
    IF ABS(cv - r) > 2 * nb THEN 'not yet settling
      settle = 0
    ELSEIF settle = 0 THEN 'start settling time
      SetlTim = t: settle = 1
    END IF
    IF settle = 1 AND t - SetlTim > 4 * Tc THEN 'settling complete
      diag = 2: Pinhib% = 0: Tinhib% = 0: upset$ = "": Peak = 0
      Tune$ = "Quiet": CALL TuneDisplay(0, " Auto "): monitor = 0
    END IF
    IF diag < 6 THEN
      IF Peak = 3 THEN GOTO EndSearch
      IF Peak = 2 AND t - Tim(2) > 2 * (Tim(2) - Tim(1)) THEN GOTO EndSearch
      IF Peak = 1 AND t - Tim(1) > 4 * Tc THEN GOTO EndSearch
    END IF
  END IF

EXIT SUB

EndSearch:
  COLOR 1: diag = 6: Tim(5) = t: Tune$ = "Settl": CALL TuneDisplay(0, " Auto ")
  EXIT SUB '************************* subroutines **************************************

MonitorOutput:
  IF monitor = 0 THEN 'initialize
    FOR j% = 0 TO 4: mp(j%) = 0: Timm(j%) = t: NEXT
    m1 = meanm: OutPeak = -1: monitor = 1: shift = 0: phase = 100: Lead = 1000
    OutThresh = (1 - 10 * Tf / Tc) * Outnb 'filtered signal has lower thresh
    m0 = meanm: Decay = 0: Period = 0: DecA = 0: RETURN
  END IF
  SELECT CASE OutPeak
  CASE -1
    IF ABS(m - m1) > Outnb THEN
      direction = SGN(m - m1): Timm(0) = t: OutPeak = 0: Ampl = 0
      mp(0) = meanm: mp(1) = mp(0): LOCATE 1, 35: PRINT SPC(22);
    ELSE
      IF Tune$ = "Cycle" THEN
        Tune$ = "Quiet"
        FOR j% = 1 TO 3: Peak(j%) = 0: Tim(j%) = 0: NEXT j%: difl = 0
      END IF
      RETURN
```

```
      END IF
   CASE 0
      IF (m - mp(1)) * direction > 0 THEN mp(1) = m: Timm(1) = t: xp = x
      IF (mp(1) - m) * direction > Outnb THEN
         OutPeak = 1: mp(1) = mp(1) - direction * (Outnb - 1) / 3: mp = mp(1)
         IF upset$ <> "set" AND Peak = 1 THEN Lead = Tim(1) - Timm(1)
         mk$ = "u1d2": GOSUB Markm: mp(2) = mp(1): GOTO OutputWave
      END IF
   CASE 1
      IF (m - mp(2)) * direction < 0 THEN mp(2) = m: Timm(2) = t: xp = x
      IF (m - mp(2)) * direction > Outnb THEN
         OutPeak = 2: mp(2) = mp(2) + direction * (Outnb - 1) / 3: mp = mp(2)
         IF Lead = 1000 AND Peak = 2 THEN Lead = Tim(2) - Timm(2)
         mk$ = "nu1nd1nr2n12": GOSUB Markm: mp(3) = mp(2)
         Period = (Timm(2) - Timm(1)) * 2.07
         IF mp(1) <> mp(0) AND Timm(1) - Timm(0) > Period / 3 AND Timm(1) - Timm(0)
  < Period / 1.5 THEN
            Decay = .8 * (mp(2) - mp(1)) / (mp(0) - mp(1))
         END IF: GOTO OutputWave
      END IF
   CASE 2
      IF (m - mp(3)) * direction > 0 THEN mp(3) = m: Timm(3) = t: xp = x: mp = m
      IF (mp(3) - m) * direction > Outnb THEN
         OutPeak = 3: mp(3) = mp(3) - direction * (Outnb - 1) / 3: mp = mp(3)
         Period = Timm(3) - Timm(1)
         IF mp(1) <> mp(2) THEN Decay = (mp(3) - mp(2)) / (mp(1) - mp(2))
         Ampl = Amp: Amp = ABS((mp(1) + mp(3)) / 2 - mp(2))
         mk$ = "bd112e2f212": GOSUB Markm: GOTO OutputWave
      END IF
   END SELECT IF info% = 0 THEN
      IF Tune$ = "Cycle" AND t - Timm(OutPeak) > 2 * Tc THEN 'cycling abated
         diag = 6: Tim(5) = t: monitor = 0: Tune$ = "Settl": CALL TuneDisplay(0, "
Auto ")
      END IF
   END IF
   IF t - Timm(OutPeak) > 2 * Tc THEN monitor = 0 'too long since last peak
   RETURN OutputWave:
   IF Period > 1.2 * Tc THEN 'normal cycle
      IF shift = 0 AND phase = 100 THEN
         phase = Lead / Period * 360
         'IF ABS(phase) < 99.5 THEN LOCATE 1, 42: COLOR 12: PRINT USING "φ=+##"; ph
ase: COLOR 1
      END IF
   END IF
SignalQuality:
   SELECT CASE OutPeak
      CASE 0, 1: info% = 0
      CASE 2
         IF Decay > 1.2 THEN info% = 1 'undamped half-cycle
         IF ABS(mp(1) - mp(2)) < 10 THEN info% = 0
      CASE 3
         IF Decay > .25 THEN info% = 1 ELSE info% = 0
         IF ABS(mp(3) - mp(2)) < OutThresh THEN info% = 0
         IF Timm(3) - Timm(2) < (Timm(2) - Timm(1)) / 2 THEN info% = 0
         IF Timm(3) - Timm(2) > (Timm(2) - Timm(1)) * 2 THEN info% = 0
   END SELECT
   IF info% THEN
      IF Decay > 0 AND Decay < 10 THEN
         LOCATE 1, 50: COLOR 12: PRINT USING "δ=#.##"; Decay
         LOCATE 1, 42: PRINT USING "A=##.#"; Amp
      END IF
      IF Period < 1000 AND Period THEN LOCATE 1, 36: COLOR 12: PRINT USING "τ=###"
; Period
   END IF: COLOR 1

IF OutPeak = 3 THEN OutPeak = 0: mp(1) = mp(3): Timm(1) = Timm(3) 'reset
   IF Decay > Dechi AND info% THEN 'output cycle
      IF Tune$ <> "Cycle" THEN Tune$ = "Cycle": CALL TuneDisplay(0, " Auto ")
      IF stun THEN GOTO AdaptOutput
   END IF
```

```
    IF stun = 0 OR info% = 0 OR Period = 0 THEN RETURN
    IF NOT (Tune$ = "Cycle" OR info% = 2) THEN RETURN 'allows tune τd w/o cycle AdaptOutput:
    IF t < AdaptTim + 3 * Tc OR t < AdaptTim + RecTim THEN RETURN 'wait for effect
    CALL CycleRules(Decay, Period, DecA)
    RETURN Markm:
    PSET (xp + 1, mp), 1: DRAW "x" + VARPTR$(mk$): RETURN 'mark chart SelfPeak:
    dif = cv - r 'deviation
    SELECT CASE Peak
    CASE 0
        IF (dif - Peak(1)) * sign >= 0 THEN Peak(1) = dif: Tim(1) = t: xc = x
        IF (Peak(1) - dif) * sign > nb THEN
            Peak = 1: Peak(2) = Peak(1): Peak(1) = Peak(1) - sign * (nb - .2) / 3 'σ-c
orr.
            mk$ = "u1d2": cp = r + Peak(1): GOSUB Markc
            IF Peak(1) - Dev0 = 0 THEN EXIT SUB
            Tune$ = "Peak1": CALL TuneDisplay(0, " Auto ")
            IF upset$ <> "set" AND OutPeak = 1 THEN Lead = Tim(1) - Timm(1)
        END IF
    CASE 1
        IF (dif - Peak(2)) * sign <= 0 THEN Peak(2) = dif: Tim(2) = t: xc = x
        IF (dif - Peak(2)) * sign > nb OR (t - Tim(1) > 2 * Tc AND diag = 5) THEN
            Peak = 2: Peak(3) = Peak(2): Peak(2) = Peak(2) + sign * (nb - .2) / 3 'σ-c
orr.
            mk$ = "nu1nd1nr2n12": cp = r + Peak(2): GOSUB Markc
            Tune$ = "Peak2": CALL TuneDisplay(0, " Auto ")
            IF ABS(Peak(1)) > 1 THEN Ovs = -Peak(2) / Peak(1)
            LOCATE 1, 14: COLOR 9: PRINT USING "Ω=+#.##"; Ovs: COLOR 1
            IF stun AND t > AdaptTim + 3 * Tc THEN CALL Peak2Rules(Ovs, Theta)
            IF OutPeak = 2 AND Lead = 1000 THEN Lead = Tim(2) - Timm(2)
        END IF
    CASE 2
        IF (dif - Peak(3)) * sign >= 0 THEN Peak(3) = dif: Tim(3) = t: xc = x
        IF (Peak(3) - dif) * sign > nb THEN
            Peak = 3: Peak(3) = Peak(3) - sign * (nb - .2) / 3 'σ-corr.
            mk$ = "bd1l2e2f2l2": cp = r + Peak(3): GOSUB Markc
            Tune$ = "Peak3": CALL TuneDisplay(0, " Auto ")
        END IF
    END SELECT
    RETURN Markc:
    PSET (xc + 1, cp), 12: DRAW "x" + VARPTR$(mk$): RETURN 'mark chart
END SUB SUB CycleRules (Decay, Period, DecA) STATIC P1 = P: Tc1 = Tc 'remember settings IF Period <= Tc THEN 'FastCycle
    IF Decay > Dechi THEN GOSUB GuessTc
ELSE 'NormalCycle
    IF Pr$ = "NSR" OR T1 + T2 > Td THEN 'lag-dominant
        IF D THEN Thi = 2.2 ELSE Thi = 2
        IF Tc > Period / 1.7 AND Tinhib% = 0 THEN 'Tc too high
            Tc = CINT(Period / 1.7): Rule$ = "τ1.7"
        ELSEIF Tc < Period / Thi AND Tinhib% = 0 THEN 'Tc too low
            Ct = 3 - I / Tc: IF Ct > 2.5 THEN Ct = 2.5
            Tc = CINT(Period / Ct): Rule$ = "τ2.5"
        ELSE 'adjust P
            IF Decay < Declo OR Decay > Dechi THEN
                IF Pinhib% = 0 THEN P = P * (1 + (Decay - DecayTgt) / 2): Rule$ = "Pδ"
                Pinhib% = 0 'inhibit only once
            END IF
        END IF
    ELSE 'deadtime-dominant
        IF Decay < Declo OR Decay > Dechi THEN
```

```
        IF Period < 1.5 * Tc THEN 'τd mismatch
           GOSUB GuessTc
        ELSE 'gain mismatch
           IF Pinhib% = 0 THEN P = P * (1 + Decay) / (1 + DecayTgt): Rule$ = "Pδ"
           Pinhib% = 0 'inhibit only once
        END IF
      END IF
   END IF
END IF IF Tc1 <> Tc THEN
   Tinhib% = 1: IF lok% = 1 THEN I = I * Tc / Tc1: IF D THEN D = D * Tc / Tc1
   CALL Report(Rule$, 12)
ELSE Tinhib% = 0
END IF: IF P1 <> P THEN CALL Report(Rule$, 12)
EXIT SUB '------------------------------------------------------------

GuessTc:
   IF DecA = 0 THEN 'new cycle
      GOSUB DecTc
   ELSEIF Decay > DecA THEN 'getting worse - reverse
      IF Tc > Tc1 THEN GOSUB DecTc ELSE GOSUB IncTc
   ELSE IF Tc < Tc1 THEN GOSUB DecTc ELSE GOSUB IncTc 'getting better
   END IF
   DecA = Decay
RETURN IncTc:
   IF Decay > .95 THEN Tc1 = Tc: Tc = Tc / (1 - .83 * (Decay - .95))
   Rule$ = "τδ" + CHR$(24)
   RETURN DecTc:
   IF Decay > .8 THEN Tc1 = Tc: Tc = Tc / (1 + .67 * (Decay - .8))
   Rule$ = "τδ" + CHR$(25)
   RETURN
END SUB SUB Peak2Rules (Ovs, Theta)

P1 = P: I1 = I: D1 = D: Tc1 = Tc 'save setting

Deadtime:
   IF T1 + T2 < .2 * Td THEN 'deadtime process
      IF (Ovs < 0 OR Ovs > .1) AND Pinhib% = 0 THEN P = P * (1 + Ovs): Rule$ = "PΩ0"
      GOTO CheckLock
   END IF Region:
   IF Ovs < OvsTgt THEN 'insuf.Ω
      IF Theta < ThetaTgt + .1 THEN GOTO AdjTd ELSE GOTO AdjPTheta
   ELSE 'excess Ω
      dOvs = Ovs - OvsTgt
      SELECT CASE Theta - ThetaTgt
         CASE IS < -.5 * dOvs: GOTO AdjP1
         CASE -.5 * dOvs TO dOvs: GOTO AdjTd
         CASE dOvs TO 2.5: GOTO AdjPTheta
         CASE IS > 2.5: IF D THEN GOTO AdjP2 ELSE GOTO AdjPTheta
      END SELECT
   END IF AdjP1:
   IF Pinhib% THEN EXIT SUB
   P = P * (1 + Ovs - OvsTgt): Rule$ = "PΩ1": GOTO CheckLock AdjP2:
   IF Pinhib% THEN EXIT SUB
   P = P / (1 + 6 * Ovs): Rule$ = "PΩ2": GOTO CheckLock AdjTd:
   IF Tinhib% THEN EXIT SUB
   IF D THEN k1 = .6 ELSE k1 = 1
   Tc = CINT(Tc * (1 + k1 * (Ovs - OvsTgt))): Rule$ = "τΩ": GOTO CheckLock
```

```
AdjPTheta:
  IF Pinhib% THEN EXIT SUB
  TTT = Td / (Td + T1 + T2): k2 = .5 * (1 + T2 / Td) * (1 - TTT)
  P = P / (1 + k2 * (Theta - ThetaTgt) ^ 1.5): Rule$ = "PΘ": GOTO CheckLock CheckLock:
  IF Tc <> Tcl THEN
    IF lok% = 1 THEN D = D * Tc / Tcl: I = I * Tc / Tcl
  ELSEIF ABS(P / P1 - 1) < .01 OR CINT(P) = CINT(P1) THEN
    P = P1 'deadband ±1% or one integer
  END IF
  IF P <> P1 OR I <> I1 OR D <> D1 OR Tc <> Tcl THEN CALL Report(Rule$, 9)

END SUB

SUB Report (Rule$, attr%)

COLOR attr%: LOCATE 22, 15 + x \ 8: LINE (x, 1)-(x, 3), attr% 'mark chart

SELECT CASE LEFT$(Rule$, 1)
CASE "P"
  IF ABS(P) < 1 THEN P = 1 * SGN(P): Rule$ = Rule$ + " @P-limit"
  IF ABS(P) > 2000 THEN P = 2000 * SGN(P): Rule$ = Rule$ + " @P-limit"
  PRINT "P"; : LOCATE 12, 4: PRINT USING "####"; ABS(P)
CASE "I"
  IF I < 0 THEN I = 0: Rule$ = Rule$ + " @I-limit"
  IF I > Tc - D / 2 THEN I = Tc - D / 2: Rule$ = Rule$ + " @I-limit"
  PRINT "I"; : LOCATE 13, 4: PRINT USING "####.#"; I
CASE "D"
  IF D < 0 THEN D = 0: Rule$ = Rule$ + " @D-limit"
  IF D > (I + Tc) * 1.25 THEN D = (I + Tc) * 1.25: Rule$ = Rule$ + " @D-limit"
  LOCATE 14, 4: PRINT USING "####.#"; D
CASE "τ"
  IF Tc < 0 THEN Tc = 0: Rule$ = Rule$ + " @τ-limit"
  IF Tc > 100 THEN Tc = 100: Rule$ = Rule$ + " @τ-limit"
  PRINT "τ"; : LOCATE 15, 4: PRINT USING "####"; Tc
  IF lok% = 1 THEN 'DynLock on
    LOCATE 13, 4: PRINT USING "####.#"; I
    IF D THEN LOCATE 14, 4: PRINT USING "####.#"; D
    Rule$ = Rule$ + "-DynLocked"
    VIEW: WINDOW: LINE (25, 168)-(75, 194), attr%, B
    VIEW (114, 17)-(634, 317): WINDOW (0, 0)-(520, 100)
  END IF
END SELECT msg$ = " Rule: " + Rule$ + " (strike any key to proceed).": CALL Message(9, msg$ )
DO UNTIL LEN(INKEY$): LOOP
CALL Message(9, ""): COLOR 1: what = History(0, Rule$, t): AdaptTim = t

END SUB
```

I claim:

1. In a deadtime process controller of the type having a process control section that responds to a controlled variable signal representative of a first characteristic of a process, and that generates a manipulated variable signal for application to said process to manipulate said first characteristic toward a preselected value, wherein said process control includes means for storing one or more control parameters and for generating said manipulated signal as a function of said one or more control parameters and said controlled variable signal the improvement comprising self-tuning means, responsive to any of said one or more control parameters, said controlled variable signal and said manipulated variable signal, for monitoring at least one of (i) a recovery time $\theta$ of a deviation error signal associated with said controlled variable signal, (ii) a waveform period $\tau_o$ of said manipulated variable signal, and (iii) a decay ratio $\delta$ of said manipulated variable signal, for iteratively modifying and storing in said process control section at least one of said control parameters to minimize an integrated absolute error between said controlled variable signal and a setpoint for step load process changes introduced by said manipulated variable signal and, thereby, to improve control of said process by said process control section.

2. In the deadtime controller of claim 1 for use with a multi-order and lag-dominant process, wherein said process control section generates said manipulated variable signal as a function of a deadtime parameter $\tau_d$ representative of the controller deadtime and an integration parameter I representative of the controller integration time, the improvement wherein said self-tuning means further comprises:

(i) period measurement means for determining the periodicity $\tau_o$ of the time waveform of said manipulated variable signal, (ii) first determination means for responding to said periodicity $\tau_o$ being less than $1.7^*\tau_d$ and for generating a modified controller deadtime $\tau_d$ having a value of $\tau_o/1.7$, and (iii) a second determination means for responding to said periodicity $\tau_o$ being greater than $2^*\tau_d$ and for generating a modified controller deadtime $\tau_d$ having a value of to $\tau_o/C$, where C equals $3-I/\tau_d$, with an upper limit of 2.5.

3. In the deadtime controller of claim 1 for use with a first-order process with high frequency cycling in the time waveform of said manipulated variable signal, wherein said process control section generates said manipulated variable signal as a function of a deadtime parameter $\tau_d$ representative of the controller deadtime, the improvement wherein said self-tuning means further comprises:

(i) period measurement means for determining the period $\tau_o$ of said time waveform of said manipulated variable signal, (ii) first determination means for responding to said period $\tau_o$ being less than said controller deadtime $\tau_d$, and (iii) decay ratio means for determining whether the decay ratio $\delta$ between two successive wave amplitudes in said time waveform of said manipulated variable signal is greater than one, wherein said self-tuning means initiates a first activity when $\tau_o$ is less than $\tau_d$ and when $\delta$ is greater than one, said first activity decreasing said controller deadtime $\tau_d$ as a function of increasing decay ratio.

4. In the deadtime controller of claim 3 for wherein said self-tuning means initiates a second activity in response to said first activity when $\delta$ is greater than one, said second activity increases said controller deadtime $\tau_d$ as a function of increasing decay ratio.

5. In the deadtime controller of claim 1 for use with non-self-regulating and lag-dominant processes, wherein said process control section generates said manipulated variable signal as a function of a proportional band parameter P representative of the controller proportional band percentage, the improvement wherein said self-tuning means further comprises:

(i) storage means for selecting and storing a target decay ratio $\delta_{tgt}$, and (ii) decay ratio means for determining the decay ratio $\delta$ of said manipulated variable signal and determining whether $\delta$ is between 0.3 and 0.6, wherein said self-tuning means generates a modified proportional band parameter P having a value of $P(1+\delta)/(1+\delta_{tgt})$ when $\delta$ is outside the range 0.3 and 0.6.

6. In the deadtime controller of claim 1 for use with a process which is predominantly deadtime, wherein said process control section generates said manipulated variable signal as a function of a proportional band parameter P representative of the controller proportional band percentage, the improvement wherein said self-tuning means further comprises:

(i) overshoot determination means for determining the overshoot $\Omega$ of the deviation error signal waveform by measuring the amplitude of a first peak, $e_1$, of said waveform, and measuring a second peak, $e_2$, of said waveform, and calculating the overshoot $\Omega$ by setting $\Omega$ equal to $-e_2/e_1$, said deviation error signal representing the difference between said controlled variable signal and said preselected value, wherein said self-tuning means generates a modified proportional band parameter P having a value of $P(1+\Omega)$.

7. In the deadtime controller of claim 1, wherein said process control section generates said manipulated variable signal as a function of a proportional band parameter P representative of the controller proportional band percentage, the improvement wherein said self-tuning means further comprises:

(i) storage means for selecting and storing a target overshoot $\Omega_{tgt}$, and (ii) overshoot determination means for determining the overshoot $\Omega$ of the deviation error signal waveform by measuring the amplitude of a first peak, $e_1$, of said waveform, and measuring a second peak, $e_2$, of said waveform, and calculating the overshoot $\Omega$ by setting $\Omega$ equal to $-e_2/e_1$, said deviation error signal representing the difference between said controlled variable signal and said preselected value, wherein said self-tuning means generates a modified proportional band parameter P having a value of $P(1+\Omega-\Omega_{tgt})$.

8. In the deadtime controller of claim 1, wherein said process control section generates said manipulated variable signal as a function of a deadtime parameter $\tau_d$ and a proportional parameter P representative of a controller proportional band percentage, the improvement wherein said self-tuning means further comprises:
  (i) storage means for selecting and storing a target recovery time $\theta_{tgt}$, and primary and secondary time constants $\tau_1$ and $\tau_2$, and
  (ii) recovery determination means for determining the recovery time $\theta$ of the deviation error signal waveform by measuring the amplitude of a first peak, $e_1$, of said waveform, and measuring after an elapsed time $\tau_d$ a second value of said waveform, $e_t$, and calculating the recovery $\theta$ by setting $\theta$ equal to $1/(1-e_t/(0.6e_1))$, said deviation error signal representing the difference between said controlled variable signal and said preselected value, wherein said self-tuning means generates a modified proportional band parameter P having a value of $P/(1+k_2(\theta-\theta_{tgt})^{1.5})$, where $k_2=0.5(1+\tau_2/\tau_d)(1-T)$ and $T=\tau_d/(\tau_d+\tau_1+\tau_2)$.

9. In the deadtime controller of claim 1, wherein said process control section generates said manipulated variable signal as a function of a proportional band parameter P representative of the controller proportional band percentage, the improvement wherein said self-tuning means further comprises:
  (i) overshoot determination means for determining the overshoot $\Omega$ of the deviation error signal waveform by measuring the amplitude of a first peak, $e_1$, of said waveform, and measuring the second peak, $e_2$, of said waveform, and calculating the overshoot $\Omega$ by setting $\Omega$ equal to $-e_2/e_1$, said deviation error signal representing the difference between said controlled variable signal and said preselected value, wherein said self-tuning means generates a modified proportional band parameter P having a value of $P/(1+6\Omega)$.

10. In a deadtime controller of claim 1, the improvement wherein said self-tuning means further comprises:
  (i) overshoot determination means for determining the overshoot $\Omega$ of the deviation error signal by measuring the amplitude of a first peak, $e_1$, of said waveform, and measuring a second peak, $e_2$, of said waveform, and calculating the overshoot $\Omega$ by setting $\Omega$ to $-e_2/e_1$, said deviation error signal representing the difference between said controlled variable signal and said preselected value,
  (ii) recovery determination means for determining the recovery time $\theta$ of said deviation error signal waveform, said recovery time measured as the time between when said controlled variable signal reaches a peak deviation from said preselected value of said process due to a load disturbance insert to said process, and when said controlled variable signal is expected to return to said preselected value, and
  (iii) storage means for selecting and storing a target recovery value $\theta_{tgt}$ and a target overshoot value $\theta_{tgt}$, said target recovery and said target overshoot values representing desired operational target values to achieve a minimum integrated absolute error in the step-load response of said deviation error signal, said self-tuning section 16 comparing $\theta$ and $\Omega$ with respective target values $\theta_{tgt}$ and $\Omega_{tgt}$, said self-tuning means modifying at least one of said control parameters on the basis of said comparisons.

11. In the deadtime controller of claim 10 wherein said self-tuning means further comprises:
  (i) overshoot-recovery rule selection means for storing a two-dimensional matrix of measurable values of $\Omega$ and $\theta$, said measurable values corresponding to one or more tuning rules to adjust one or more of said controller parameters, wherein said self-tuning section measures $\Omega$ and $\theta$ selects the corresponding tuning rule to adaptively adjust said controller parameters.

12. In the deadtime controller of claim 1, wherein said process control section generates said manipulated variable signal as a function of a controller deadtime parameter $\tau_d$, an integral time parameter I, and a derivative time parameter D, the improvement wherein said self-tuning means further comprises pretuning means for selectively modifying each of said controller parameters prior to control of said process.

13. In the deadtime controller of claim 12, the improvement wherein said self-tuning means further comprises:
  (i) I-ratio means for storing the I-ratio, $I/\tau_d$, prior to the control of said process and for automatically adjusting said I parameter during process control activities to maintain said I-ratio, and
  (ii) D-ratio means for storing the D-ratio, $D/\tau_d$, prior to the control of said process and for automatically adjusting said D parameter during process control activities to maintain said D-ratio.

14. A method for tuning a deadtime process controller, said controller of the type which responds to a controlled variable signal representative of a first characteristic of a process, and that generates a manipulated variable signal for application to said process to manipulate said first characteristic towards a preselected value, said manipulated variable signal generated as a function of one or more control parameters stored within said controller and as a function of said controlled variable signal, the improvement comprising the step of monitoring at least one of
  (i) a recovery time $\theta$ of a deviation error signal associated with said controlled variable signal,
  (ii) a waveform period $\tau_o$ of said manipulated variable signal, and
  (iii) a decay ratio $\delta$ of said manipulated variable signal, to iteratively modify at least one of said control parameters during process control activities to minimize an integrated absolute error between said controlled variable signal and a setpoint for step load process changes introduced by said manipulated variable signal and, thereby, to improve control of said process according to the behavior of said manipulated variable signal and said controlled variable signal.

15. A method according to claim 14, wherein said deadtime controller is of the type that generates said manipulated variable signal as a function of a deadtime parameter $\tau_d$ representative of the controller deadtime, the improvement comprising the further steps of:
  A. measuring the periodicity $\tau_o$ of the manipulated variable signal output waveform,
  B. determining whether said periodicity is less than $1.7^*\tau_d$, and
  C. modifying said controller deadtime $\tau_d$ to $\tau_o/1.7$ if $\tau_o$ is less than $1.7\tau_d$.

16. A method according to claim 14, wherein said deadtime controller is of the type that generates said manipulated variable signal as a function of a deadtime parameter $\tau_d$ representative of the controller deadtime, the improvement comprising the further steps of:
- A. measuring the periodicity $\tau_o$ of the manipulated variable signal output waveform,
- B. determining whether said periodicity is more than $2.0^*\tau_d$, and
- C. modifying said controller deadtime $\tau_d$ to $\tau_O/C$ if $\tau_o$ exceeds $2.0^*\tau_d$, where C equals $3 - 1/\tau_d$ with an upper limit of 2.5.

17. A method according to claim 14, the improvement comprising the further steps of:
- A. analyzing the successive wave amplitudes in the time waveform of said manipulated variable signal to determine a decay ratio, and
- B. modifying at least one of said parameters according to said decay ratio.

18. A method according to claim 14, the improvement comprising the further steps of:
- A. analyzing the deviation error signal during process control disturbances to determine an overshoot value, said deviation error signal representing the difference between said controlled variable signal and said preselected value, and
- B. modifying at least one of said parameters according to said overshoot value.

19. A method according to claim 14, the improvement comprising the further steps of:
- A. analyzing the deviation error signal during process control activities to determine the recovery time, said deviation error signal representing the difference between said controlled variable signal and said preselected value, and
- B. modifying at least one of said parameters according to said recovery time.

20. A method according to claim 14, wherein said deadtime controller is of the type that generates said manipulated variable signal as a function of a deadtime parameter $\tau_d$, the improvement comprising the steps of:
- A. determining whether the oscillations in said manipulated variable signal are expanding or contracting,
- B. modifying said the parameter $\tau_d$ in first direction if said oscillations are expanding,
- C. determining the decay ratio of the time waveform of said manipulated variable signal by analyzing and measuring the peak wave amplitudes of said time waveform, and
- D. modifying said parameter $\tau_d$ in a direction opposite to said first direction if said oscillations are expanding.

* * * * *